(12) United States Patent
Shin et al.

(10) Patent No.: US 11,757,093 B2
(45) Date of Patent: Sep. 12, 2023

(54) COMPOSITIONS AND METHODS FOR MULTILAYER DRY COATED AND WET CAST FILM HYBRID ELECTRODE FILMS

(71) Applicant: Tesla, Inc., Austin, TX (US)

(72) Inventors: Joon Ho Shin, San Diego, CA (US); Hieu Minh Duong, Rosemead, CA (US); Amado Marcelino Garcia Acevedo, Murrieta, CA (US)

(73) Assignee: Tesla, Inc., Austin, TX (US)

( * ) Notice: Subject to any disclaimer, the term of this patent is extended or adjusted under 35 U.S.C. 154(b) by 445 days.

(21) Appl. No.: 16/831,484

(22) Filed: Mar. 26, 2020

(65) Prior Publication Data

US 2020/0313175 A1 Oct. 1, 2020

Related U.S. Application Data

(60) Provisional application No. 62/826,807, filed on Mar. 29, 2019.

(51) Int. Cl.

| | |
|---|---|
| *H01M 4/36* | (2006.01) |
| *H01G 11/28* | (2013.01) |
| *H01G 11/38* | (2013.01) |
| *H01M 4/62* | (2006.01) |
| *H01M 4/88* | (2006.01) |

(52) U.S. Cl.
CPC ............ *H01M 4/366* (2013.01); *H01G 11/28* (2013.01); *H01G 11/38* (2013.01); *H01M 4/621* (2013.01); *H01M 4/8896* (2013.01)

(58) Field of Classification Search
CPC .................................................. H01M 4/366
See application file for complete search history.

(56) References Cited

U.S. PATENT DOCUMENTS

| | | | | |
|---|---|---|---|---|
| 2005/0266298 A1* | 12/2005 | Mitchell | ................ | H01G 11/28 |
| | | | | 429/522 |
| 2006/0146479 A1* | 7/2006 | Mitchell | .................. | H01G 9/00 |
| | | | | 361/502 |

(Continued)

FOREIGN PATENT DOCUMENTS

| | | | | | |
|---|---|---|---|---|---|
| CN | 104064725 A | * | 9/2014 | .......... | H01M 4/0404 |
| CN | 111201640 A | * | 5/2020 | .......... | H01M 10/056 |

(Continued)

OTHER PUBLICATIONS

International Search Report and Written Opinion dated Jun. 30, 2020 in PCT/US2020/025047.

*Primary Examiner* — Amanda C. Walke
(74) *Attorney, Agent, or Firm* — Knobbe Martens Olson & Bear, LLP

(57) ABSTRACT

Provided herein are energy storage device electrode films comprising a hybrid electrode film, and methods of forming such multilayer hybrid electrode films and energy storage devices comprising multilayer hybrid electrode films. Each hybrid electrode film may comprise a self-supporting dry coated active layer and a wet cast active layer, wherein each active layer comprises a binder and an active material. The binder and/or active material may be the same or different as any other active layer. The hybrid multilayer electrode film may further comprise at least one additional layer, and the hybrid multilayer electrode film may be laminated with a current collector to form an electrode.

21 Claims, 22 Drawing Sheets

(56) References Cited

U.S. PATENT DOCUMENTS

| | | | |
|---|---|---|---|
| 2006/0246343 A1* | 11/2006 | Mitchell | H01M 4/0416 |
| | | | 429/479 |
| 2008/0057401 A1* | 3/2008 | Mori | H01M 10/0569 |
| | | | 429/303 |
| 2010/0020471 A1 | 1/2010 | Schneuwly | |
| 2011/0114896 A1* | 5/2011 | Mitchell | B05D 5/12 |
| | | | 252/502 |
| 2015/0255779 A1 | 9/2015 | Hong et al. | |
| 2016/0149208 A1* | 5/2016 | Suzuki | H01M 4/0404 |
| | | | 429/209 |
| 2018/0241079 A1 | 8/2018 | Duong et al. | |
| 2021/0098770 A1* | 4/2021 | Yudi | H01M 4/1391 |

FOREIGN PATENT DOCUMENTS

| | | | | |
|---|---|---|---|---|
| CN | 113646932 A | * | 11/2021 | H01M 10/052 |
| EP | 2988352 B1 | * | 11/2017 | H01M 4/131 |
| WO | WO-2020150266 A1 | * | 7/2020 | H01M 10/0525 |

* cited by examiner

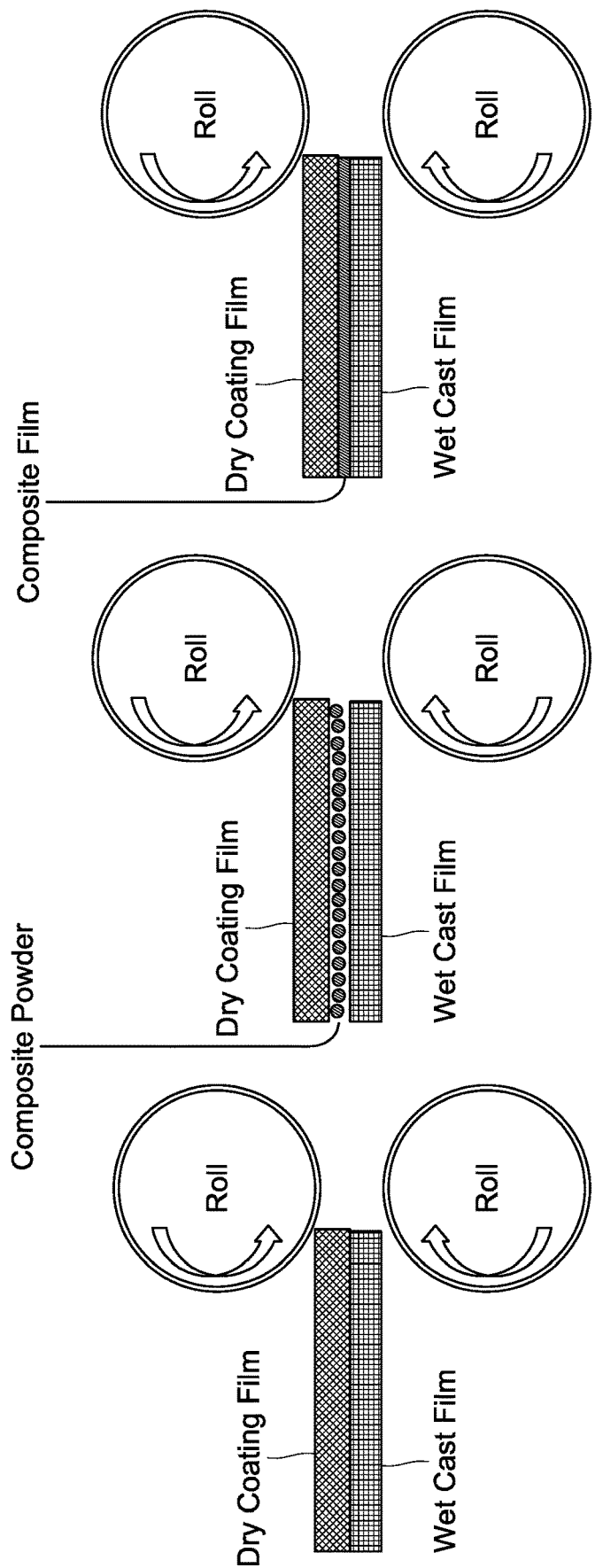

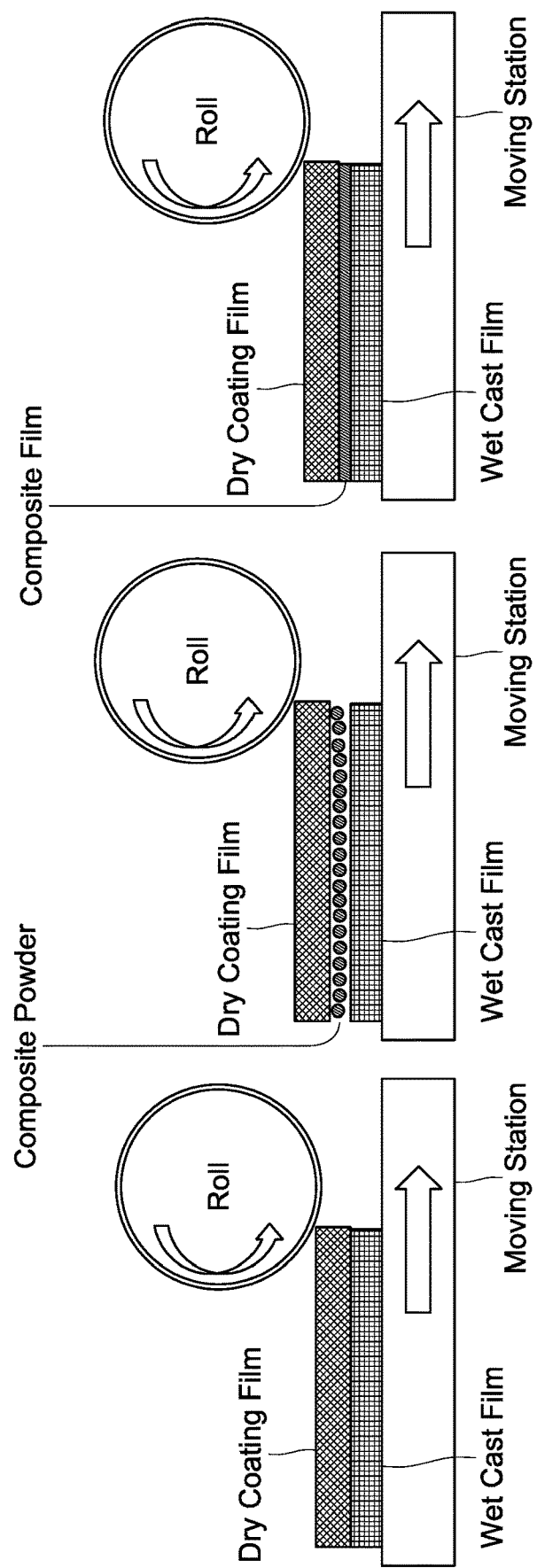

COMPOSITIONS AND METHODS FOR MULTILAYER DRY COATED AND WET CAST FILM HYBRID ELECTRODE FILMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Prov. App. No. 62/826,807, filed Mar. 29, 2019, which is incorporated by reference herein in its entirety for all purposes.

BACKGROUND

Field

The present invention relates generally to energy storage devices, and specifically to materials and methods for multilayer electrode films.

Description of the Related Art

Electrical energy storage cells are widely used to provide power to electronic, electromechanical, electrochemical, and other useful devices. Such cells include batteries such as primary chemical cells and secondary (rechargeable) cells, fuel cells, and various species of capacitors, including ultracapacitors. Increasing the operating power and energy of energy storage devices, including capacitors and batteries, would be desirable for enhancing energy storage, increasing power capability, and broadening real-world use cases.

Existing methods of electrode film fabrication for energy storage devices may impose a practical limit to various structural electrode properties. Thus, new electrode film formulations, and methods for their fabrication, may result in improved performance. Additionally, novel combinations of electrode films may reveal combinations that provide improved performance to an energy storage device.

SUMMARY

For purposes of summarizing the invention and the advantages achieved over the prior art, certain objects and advantages of the invention are described herein. Not all such objects or advantages may be achieved in any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In one aspect, a multilayer hybrid electrode is provided. The multilayer hybrid electrode includes one dry processed active layer and one wet processed active layer.

In some embodiments, the dry processed active layer comprises an first active material and a first binder. In some embodiments, the first binder is a first fibrillizable binder. In some embodiments, the wet processed active layer comprises an second active material and a second binder. In some embodiments, the second binder is a first fibrillizable binder. In some embodiments, the multilayer hybrid electrode film further comprises at least one additional layer. In some embodiments, the additional layer comprises a composite powder, a composite powder paste, a composite film or an adhesive paste.

In another aspect, a method for forming a multilayer hybrid electrode is provided. All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

In another aspect, a multilayer electrode film for use in an energy storage device is provided. The multilayer electrode film includes a dry-processed active layer including a first active material, and a fibrillized binder, wherein the dry processed active layer is absent of processing solvent residue, and a wet-processed active layer including a second active material, and at least some processing solvent residue.

In some embodiments, the dry-processed active material and the wet-processed active material are directly disposed over each other. In some embodiments, the multilayer electrode film further comprises an additional layer. In some embodiments, the additional layer is disposed over both the dry-processed active layer and the wet-processed active layer. In some embodiments, the additional layer is disposed between the dry-processed active layer and the wet-processed active layer. In some embodiments, the additional layer is a multilayer additional layer.

In some embodiments, the additional layer is selected from the group consisting of a composite powder, a composite film, an adhesive paste, a composite powder paste, and combinations thereof. In some embodiments, the composite powder comprises a powder selected from the group consisting of Si, $SiO_x$, $Li_xSiO_y$ alloy, Li, Li alloy, and combinations thereof. In some embodiments, the composite film comprises a powder selected from the group consisting of Si, $SiO_x$, $Li_xSiO_y$ alloy, Li, Li alloy, and combinations thereof. In some embodiments, the adhesive paste comprises an adhesive selected from the group consisting of a room temperature ionic liquid, a conductive carbon paste, a liquid polymer, and combinations thereof. In some embodiments, the composite powder paste further comprises a ceramic filler.

In some embodiments, the multilayer electrode film is free-standing. In some embodiments, an electrode including a current collector and the multilayer electrode film is described. In some embodiments, a battery including the electrode is described.

In another aspect, a multilayer electrode film fabrication process is described. The process includes providing a dry-processed active layer including a first active material, and a fibrillized binder, wherein the dry-processed active layer is free-standing and is absent of processing solvent residue, and providing a wet-processed active layer including a second active material, and at least some processing solvent residue, disposing the dry-processed active layer over the wet-processed active layer, laminating the dry-processed and wet-processed active layers to form a multilayer electrode film.

In some embodiments, lamination is performed by the process selected from the group consisting of passing the dry-processed and wet-processed active layers between two rollers, passing the dry-processed and wet-processed active layers through one roller while positioned on a moving station, pressing the dry-processed and wet-processed active layers between two plates, and combinations thereof. In some embodiments, the dry-processed active layer is provided as a rolled free-standing film, and wherein disposing the dry-processed active layer on the wet-processed active layer comprises unrolling the dry-processed active layer.

In some embodiments, the process further comprises disposing an additional layer over the wet-processed active layer. In some embodiments, the process further comprises disposing an additional layer over the dry-processed active layer. In some embodiments, the process further comprises disposing an additional layer over the multilayer electrode film.

In another aspect, a multilayer electrode film fabrication process is provided. The process includes providing a dry-processed active layer including a first active material, and a fibrillized binder, wherein the dry-processed active layer is free-standing and is absent of processing solvent residue, and providing an active layer slurry mixture including a second active material, and a processing solvent, disposing active layer slurry mixture over the dry-processed active layer, drying the deposited active layer slurry mixture to form a wet-processed active layer including a second active material, and at least some processing solvent residue, and laminating the dry-processed and wet-processed active layers to form a multilayer electrode film.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 2A depicts a dry film/wet film configuration. FIG. 2B depicts a dry film/composite powder/wet film configuration. FIG. 2C depicts a dry film/composite film/wet film configuration.

FIG. 3A depicts a dry film/adhesive paste/wet cast film configuration. FIG. 3B depicts a dry film/composite powder paste/wet cast film configuration. FIG. 3C depicts a dry film/adhesive paste/composite film/wet cast film configuration.

FIGS. 4A-4C depict embodiments of a lamination process of rolling dry coat films and wet cast films to form hybrid electrode film configurations. FIG. 4A depicts the lamination of a dry film/wet cast film configuration. FIG. 4B depicts the lamination of a dry film/composite powder paste/wet cast film configuration. FIG. 4C depicts the lamination of a dry film/composite film/wet cast film configuration.

FIGS. 5A-5C depict embodiments of the lamination process of rolling dry coat films and wet cast films to form a hybrid electrode film configurations by rolling between a roll and a moving station. FIG. 5A depicts the lamination of a dry film/wet film configuration. FIG. 5B depicts the lamination of a dry film/composite powder/wet film configuration. FIG. 5C depicts the lamination of a dry film/composite film/wet film configuration.

FIG. 6A depicts the lamination of a dry film/wet film configuration. FIG. 6B depicts the lamination of a dry film/composite powder/wet film configuration. FIG. 6C depicts the lamination of a dry film/composite film/wet film configuration.

FIG. 7A depicts the lamination of a dry film/wet film configuration. FIG. 7B depicts the lamination of a dry film/composite powder/wet film configuration. FIG. 7C depicts the lamination of a composite powder/dry film/wet film configuration.

DETAILED DESCRIPTION

Figure 1:
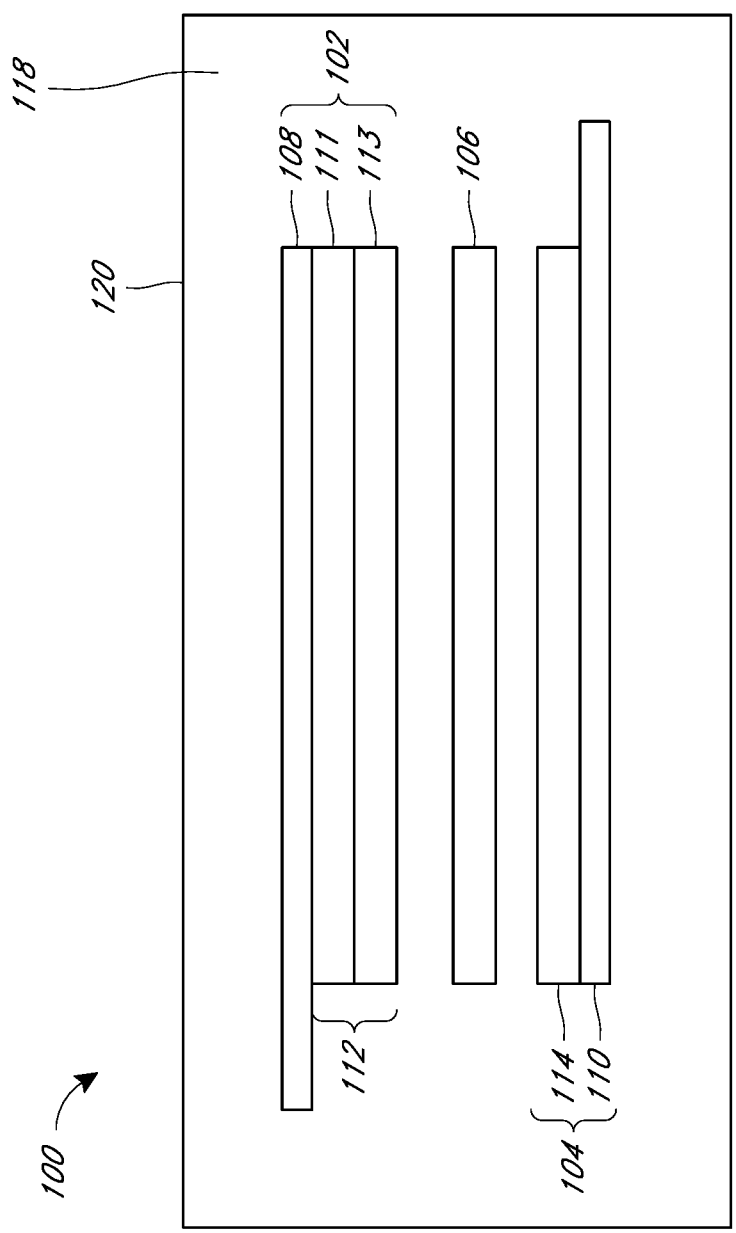
FIG. 1 depicts an embodiment of an energy storage device with an electrode film comprising a hybrid multilayer electrode film.

Embodiments relate to hybrid electrode films that comprise a first film made by a dry process and a second film made by a wet process. These electrode films may be rolled or calendared together by various methods described below to form a single hybrid film that is useful in a variety of energy storage devices. For example, the hybrid film may be used as an anode or cathode within a lithium ion battery.

Definitions

The terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone, or operated as a component of a multi-cell system.

The voltage of an energy storage device is the operating voltage for a single battery or capacitor cell. Voltage may exceed the rated voltage or be below the rated voltage under load, or according to manufacturing tolerances.

A "self-supporting" electrode film is an electrode film that incorporates binder matrix structures sufficient to support the film or layer and maintain its shape such that the electrode film or layer can be free-standing. When incorporated in an energy storage device, a self-supporting electrode film or active layer is one that incorporates such binder matrix structures. Generally, and depending on the methods employed, such electrode films or active layers are strong enough to be employed in energy storage device fabrication processes without any outside supporting elements, such as a current collector or other film. For example, a "self-supporting" electrode film can have sufficient strength to be rolled, handled, and unrolled within an electrode fabrication process without other supporting elements. A dry electrode film, such as a cathode electrode film or an anode electrode film, may be self-supporting. A dry-processed layer can have sufficient strength such that a multilayer electrode film formed from the dry-processed layer and a wet-processed layer is self-supporting and free-standing.

A "solvent-free" electrode film is an electrode film that contains no detectable, or substantially no, processing solvents, nor processing solvent residues and/or processing solvent impurities. Such a "solvent-free" electrode film is distinguished from conventional electrode films based upon conventional solvent-based processes, which contain detectable, or a substantial amount, of processing solvents, processing solvent residues, and/or processing solvents impurities, even after the solvent-based film has undergone a drying process. A dry electrode film, such as a cathode electrode film or an anode electrode film, may be solvent-free. A dry electrode film that is solvent-free can be made from dry constituents, such as dry active material and dry binder (e.g., powders) that are also solvent-free as defined above. In some embodiments, the dry constituents may contain some amount of atmospheric moisture due to absorption of a trace amount of humidity from the surrounding air. In some embodiments, the solvent-free constituents and/or solvent-free electrode films contain a moisture content of, of about, of at most, or of at most about, 2000 ppm, 1500 ppm, 1000 ppm, 900 ppm, 800 ppm, 700 ppm, 600 ppm, 500 ppm, 400 ppm, 300 ppm, 200 ppm, 100 ppm, 50 ppm or 10 ppm, or any range of values therebetween.

A "wet" electrode, "wet process" electrode, or slurry electrode, is an electrode prepared by at least one step involving a slurry of active material(s), binder(s), and optionally additive(s). A wet electrode may include processing solvents, processing solvent residues, and/or processing solvent impurities.

Description

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

Provided herein are various embodiments incorporating electrode films formed from multiple active layers. An electrode film for use in an energy storage device may be fabricated from a plurality of active layers as provided herein. Further, an energy storage device may be constructed by a method of stacking a plurality of active layers to form an electrode film, as provided herein.

One embodiment is a multilayer electrode film comprising one dry processed active layer and one wet processed active layer, and may be referred to as a "multilayer hybrid electrode film" or "hybrid multilayer electrode film." In some embodiments, the dry processed active layers may each be a self-supporting film that can be handled individually, with the dry and wet processed active layers stacked to form a single electrode film, and laminated to a current collector to form an electrode.

In some embodiments, a multilayer electrode film may have an improved pore structure on the surface of the electrode film compared to a conventional electrode film of similar composition and density. In some instances, stacking active layers of identical composition into a single electrode film may be more cost effective compared to forming the electrode film as a single layer. Thick electrode film may have use in, for example, medical devices, mobile devices and/or vehicles.

In some embodiments, each active layer can comprise the same or different active material, the same or different binder, the same or different thickness, the same or different dimensions, as another active layer in the same electrode film. Generally, the number of active layers that can be combined in a single electrode film is not limited expect by fundamental physical properties, such as compressibility and ionic and/or electrical conductivity, that may restrict the number of active layers in an electrode film of an energy storage device.

In some embodiments, the hybrid multilayer electrode film further comprises at least one additional layer. In some embodiments, the additional layer is an intermediate layer disposed between the wet and dry processed electrode films. In some embodiments, the additional layer is disposed over both the wet and dry processed electrode films. In some embodiments, an additional layer comprises at least one of a composite powder, a composite powder paste, a composite film, an adhesive paste, and combinations thereof. In some embodiments, the additional layer is a multilayered additional layer.

The materials and methods provided herein can be implemented in various energy storage devices. For example, an energy storage device can be a capacitor, a lithium ion capacitor (LIC), an ultracapacitor, a battery such as a lithium ion battery, or a hybrid energy storage device and/or a hybrid cell, combining aspects of two or more of the foregoing. In some embodiments, the device is a battery. The energy storage device can be characterized by an operating voltage. In some embodiments, an energy storage device described herein can have an operating voltage of about 0 V to about 5 V. In further embodiments, the operating voltage can be about 2.7 V to about 4.2 V, about 3.0 to about 4.2 V, or any values therebetween.

In one embodiment, the energy storage device includes one or more electrodes. An electrode generally includes an electrode film and a current collector. The electrode film can be formed from a mixture of one or more binders and one or more active electrode material(s). It will be understood that a hybrid multilayer electrode film, and an electrode including a hybrid multilayer electrode film can be used in various embodiments with any of a number of energy storage devices and systems, such as one or more batteries, capacitors, capacitor-battery hybrids, fuel cells, or other energy storage systems or devices, and combinations thereof. In some embodiments, an electrode film mixture, and an electrode fabricating from an electrode film mixture described herein may be a component of a lithium ion capacitor, a lithium ion battery, an ultracapacitor, or a hybrid energy storage device combining aspects of two or more of the foregoing.

The energy storage device can be of any suitable configuration, for example planar, spirally wound, button shaped, or pouch. The energy storage device can also be a component of a system, for example, a power generation system, an uninterruptible power source systems (UPS), a photo voltaic power generation system, an energy recovery system for use in, for example, industrial machinery and/or transportation. An energy storage device may be used to power various electronic device and/or motor vehicles, including hybrid electric vehicles (HEV), plug-in hybrid electric vehicles (PHEV), and/or electric vehicles (EV).

In one embodiment, the energy storage device may comprise a reduced rise in equivalent series resistance over the life of the device. This can allow the device to have an increased power density over the life of the device. In some embodiments, these type of energy storage devices may have a reduced loss of capacity over the life of the device. These devices may also include improved cycling performance, including improved storage stability during cycling, and reduced capacity fade.

FIG. 1 shows a side cross-sectional schematic view of an example of an energy storage device 100 with an electrode comprising a hybrid multilayer electrode film. The energy storage device 100 may be classified as, for example, a capacitor, a battery, a capacitor-battery hybrid, or a fuel cell. In some embodiments, device 100 is a lithium ion battery.

The device has a first electrode 102, a second electrode 104, and a separator 106 positioned between the first electrode 102 and second electrode 104. The first electrode 102 and the second electrode 104 are adjacent to respective opposing surfaces of the separator 106. The energy storage device 100 includes an electrolyte 118 to facilitate ionic communication between the electrodes 102, 104 of the energy storage device 100. For example, the electrolyte 118 may be in contact with the first electrode 102, the second electrode 104 and the separator 106. The electrolyte 118, the first electrode 102, the second electrode 104, and the separator 106 are housed within an energy storage device housing 120.

One or more of the first electrode 102, the second electrode 104, and the separator 106, or constituent thereof, may comprise porous material. The pores within the porous material can provide containment for and/or increased surface area for contact with an electrolyte 118 within the housing 120. The energy storage device housing 120 may be sealed around the first electrode 102, the second electrode 104 and the separator 106, and may be physically sealed from the surrounding environment.

In some embodiments, the first electrode 102 can be an anode (the "negative electrode") and the second electrode 104 can be the cathode (the "positive electrode"). The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a suitable porous, electrically insulating material. In some embodiments, the separator 106 can comprise a polymeric material. For example, the separator 106 can comprise a cellulosic material (e.g., paper), a polyethylene (PE) material, a polypropylene (PP) material, and/or a polyethylene and polypropylene material.

Generally, the first electrode 102 and second electrode 104 each comprise a current collector and an electrode film. Electrodes 102 and 104 comprise electrode films 112 and 114, wherein first electrode film 112 is depicted as a hybrid multilayer electrode film comprising a wet processed electrode film 111 and a dry processed electrode film 113. Although second electrode film 114 is not depicted as a hybrid multilayer electrode film, it is to be understood that either or both electrode films 112 and/or 114 may be hybrid multilayer electrode films. Electrodes 102 and 104 each have a single electrode film 112 and 114 as shown, but other combinations with two or more electrode films for each electrode 102 and 104 are possible. Device 100 is shown with a single electrode 102 and a single electrode 104, but other combinations are possible. Electrode films 112 and 114 can each have any suitable shape, size and thickness. For example, the electrode films can each have a thickness of about 30 microns (m) to about 250 microns, for example, about, or at least about 50 microns, about 100 microns, about 150 microns, about 200 microns, about 250 microns, about 300 microns, about 400 microns, about 500 microns, about 750 microns, about 1000 microns, about 2000 microns, or any range of values therebetween. Further electrode film thicknesses are described throughout the disclosure, for a single electrode film. The electrode films generally comprise one or more active materials, for example, anode active materials or cathode active materials. The electrode films 112 and/or 114 may be dry and/or self-supporting electrode films, wet processed electrode films, and/or hybrid multilayer electrode films with an increased electrode film density, high energy density, high specific energy density, areal energy density, areal capacity or specific capacity. The first electrode film 112 and/or the second electrode film 114 may also include one or more binders. The electrode films 112 and/or 114 may be prepared by a process as described herein. The electrode films 112 and/or 114 may be wet, self-supporting dry or hybrid multilayer electrode films as described herein. In some embodiments, the electrode films 112 and/or 114 may further comprise an additional layer, for example at least one of a composite powder, a composite powder paste, composite film, adhesive paste or combinations thereof, as described herein. In some embodiments, the additional layer is an intermediate layer disposed between the wet processed electrode film 111 and the dry processed electrode film 113. In some embodiments, the wet processed electrode film 111 and the dry processed electrode film 113 are directly disposed over each other such that the wet processed electrode film 111 and the dry processed electrode film 113 are in direct contact. In some embodiments, the additional layer is disposed over both the wet 111 and dry 113 processed electrode films. In some embodiments, the additional layer is positioned between the first current collector 108 and the first electrode film 112. In some embodiments, the additional layer is disposed over both the first current collector 108 and the first electrode film 112. In some embodiments, the additional layer is a multilayer additional layer. In some embodiments, the multilayer additional layer comprises 2, 3, 4, 5 or 6 additional layers, or any range of values therebetween.

In some embodiments, the active material can be a carbon based material or a battery material. In some embodiments, an active material can include a lithium metal oxide, sulfur carbon composite and/or a lithium sulfide. In some embodiments, active material may include lithium nickel manganese cobalt oxide (NMC), lithium manganese oxide (LMO), lithium nickel manganese oxide (LNMO), lithium iron phosphate (LFP), lithium cobalt oxide (LCO), lithium titanate (LTO), and/or lithium nickel cobalt aluminum oxide (NCA). In some embodiments, the active material may include other material described herein. In some embodiments, active material may include one or more carbon materials. The carbon materials may be selected from, for example, graphitic material, graphite, graphene-containing materials, hard carbon, soft carbon, carbon nanotubes, porous carbon, conductive carbon, or a combination thereof. Activated carbon can be derived from a steam process or an acid/etching process. In some embodiments, the graphitic material can be a surface treated material. In some embodiments, the porous carbon can comprise activated carbon. In some embodiments, the porous carbon can comprise hierarchically structured carbon. In some embodiments, the porous carbon can include structured carbon nanotubes, structured carbon nanowires and/or structured carbon nanosheets. In some embodiments, the porous carbon can include graphene sheets. In some embodiments, the porous carbon can be a surface treated carbon. In preferred embodiments, the active material comprises, consists essentially of, or consists of graphite.

Generally, the dry electrode films described herein can be fabricated using a modified dry fabrication process. For example, some steps used to manufacture the components described in this application can be found in U.S. Patent Publication No. 2005/0266298 and U.S. Patent Publication No. 2006/0146479. These, and any other references to extrinsic documents herein, are hereby incorporated by reference in their entirety. As used herein, a dry fabrication process can refer to a process in which no or substantially no solvents are used in the formation of an electrode film. For example, components of the electrode film, including carbon materials and binders, may comprise dry particles. The dry particles for forming the electrode film may be combined to provide a dry particle electrode film mixture. In some embodiments, the electrode film may be formed from the dry particle electrode film mixture such that weight percentages of the components of the electrode film and weight percentages of the components of the dry particles electrode film mixture are substantially the same. In some embodiments, the electrode film formed from the dry particle electrode film mixture using the dry fabrication process may be free from, or substantially free from, any processing additives such as solvents and solvent residues resulting therefrom. In some embodiments, the resulting electrode films are self-supporting electrode films formed using the dry process from the dry particle mixture. In some embodiments, the resulting electrode films are free-standing electrode films formed using the dry process from the dry particle mixture. The electrode films may be a hybrid multilayer electrode films, as described herein. In some embodiments, a free-standing electrode film may be formed in the absence of a current collector. In further embodiments, an electrode film may be a self-supporting electrode film.

Generally, the wet electrode films described herein can be fabricated using a wet fabrication process. For example, wet film-forming processes may include spraying, slot die, extrusion, and printing an active layer slurry to a substrate, and then drying the processing solvent to form the wet electrode film. In some embodiments, the substrate may be a current collector, wherein drying of the slurry to the wet electrode film forms an electrode. In other embodiments, the wet electrode film may be delaminated or removed from the substrate and subsequently laminated or attached to a current collector.

As shown in FIG. 1, the first electrode 102 and the second electrode 104 include a first current collector 108 in contact with first electrode film 112, and a second current collector 110 in contact with the second electrode film 114, respectively. The first current collector 108 and the second current collector 110 facilitate electrical coupling between each corresponding electrode film and an external electrical circuit (not shown). The first current collector 108 and/or the second current collector 110 comprise one or more electrically conductive materials, and have can have any suitable shape and size selected to facilitate transfer of electrical charge between the corresponding electrode and an external circuit. For example, a current collector can include a metallic material, such as a material comprising aluminum, nickel, copper, rhenium, niobium, tantalum, and noble metals such as silver, gold, platinum, palladium, rhodium, osmium, iridium and alloys and combinations of the foregoing. For example, the first current collector 108 and/or the second current collector 110 can comprise, for example, an aluminum foil or a copper foil. The first current collector 108 and/or the second current collector 110 can have a rectangular or substantially rectangular shape sized to provide transfer of electrical charge between the corresponding electrode and an external circuit.

In some embodiments, the energy storage device 100 is a lithium ion battery or hybrid energy storage device including a cathode comprising an active material. In some embodiments, the lithium ion battery is configured to operate at about 2.5 to 5 V, or 2.7 to 4.2 V.

In some embodiments, an energy storage device is configured to operate at 3 volts or greater. In further embodiments, an energy storage device is configured to operate at 2.7 volts or greater. In some embodiments, an energy storage device is configured for operation at selected conditions of voltage and temperature. For example, an energy storage device can be configured for operation at 40° C., 45° C., 50° C., 55° C., 60° C., 65° C., 70° C., 75° C., 80° C., 85° C., 90° C., 95° C., 100° C., or greater temperatures, or any range of values therebetween. An energy storage device can be configured for continual operation at 2.7 V at 60 to 85° C., 2.8 V at 60 to 85° C., 2.9 V at 60 to 85° C., or 3 V at 60 to 85° C., or any selected temperature values there between. In some embodiments, the conditions of voltage and temperature are about 2.7 V and about 85° C., about 2.8 V and about 80° C., about 2.9 V and about 75° C., about 3 V and about 70° C., or about 3.1 V and about 65° C.

Lithium Ion Energy Storage Device

In some embodiments, energy storage device 100 can be a lithium ion energy storage device such as a lithium ion capacitor, a lithium ion battery, or a hybrid lithium ion device. In some embodiments, a lithium ion energy storage device electrode can comprise at least one hybrid multilayer electrode film comprising one or more active materials.

In some embodiments, an electrode film of a lithium ion energy storage device can comprise an anode active material. Anode active materials can comprise, for example, an insertion material (such as carbon, graphite, and/or graphene), an alloying/dealloying material (such as silicon, silicon oxide, tin, and/or tin oxide), a metal alloy or compound (such as Si—Al, and/or Si—Sn), and/or a conversion material (such as manganese oxide, molybdenum oxide, nickel oxide, and/or copper oxide). The anode active materials can be used alone or mixed together to form multiphase materials (such as Si—C, Sn—C, SiOx-C, SnOx-C, Si—Sn, Si-SiOx, Sn-SnOx, Si-SiOx-C, Sn-SnOx-C, Si—Sn—C, SiOx-SnOx-C, Si-SiOx-Sn, or Sn-SiOx-SnOx). In some embodiments, the anode active material may include graphite, metal (Li, Si, Sn etc.), metal oxide ($SiO_x$, SnO, $Li_4Ti_5O_{12}$ etc.), graphite/metal composite, graphite/metal oxide composite, and graphite/metal/metal oxide composite.

In some embodiments, an electrode film of a lithium ion energy storage device can comprise active cathode material. In some embodiments, the electrode film may further comprise a binder, and optionally a porous carbon material, and optionally a conductive additive. In some embodiments, the conductive additive may comprise a conductive carbon additive, such as carbon black. In some embodiments, the porous carbon material may comprise activated carbon. In some embodiments, the cathode active material can include a lithium metal oxide and/or a lithium sulfide. In some embodiments, the cathode active material may include lithium nickel manganese cobalt oxide (NMC), lithium manganese oxide (LMO), lithium nickel manganese oxide (LNMO), lithium iron phosphate (LFP), lithium cobalt oxide (LCO), lithium titanate (LTO), and/or lithium nickel cobalt aluminum oxide (NCA). In some embodiments, the cathode active material may include $LiNi_xMn_yCo_zO_2$ (NMC), $LiNi_{0.8}Co_{0.15}Al_{0.05}O_2$ (NCA), $LiFePO_4$ (LFP), $LiCoO_2$ (LCO), $LiMn_2O_4$ (LMO), $LiMn_{1.5}Ni_{0.5}O_4$ (LMNO), sulfur, and mixture of two or more such as NMC-NCA, NMC-LCO, NMC-NCA-LCO. The cathode active material can comprise sulfur or a material including sulfur, such as lithium sulfide ($Li_2S$), or other sulfur-based materials, or a mixture thereof. In some embodiments, the cathode film comprises a sulfur or a material including sulfur active material at a concentration of at least 50 wt %. In some embodiments, the cathode film comprising a sulfur or a material including sulfur active material has an areal capacity of at least 10 mAh/cm². In some embodiments, the cathode film comprising a sulfur or a material including sulfur active material has an electrode film density of 1 g/cm³. In some embodiments, the cathode film comprising a sulfur or a material including sulfur active material further comprises a binder.

In some embodiments, a cathode electrode film of a lithium ion battery or hybrid energy storage device can include about 70 weight % to about 98 weight % of the active material, including about 70 weight % to about 96 weight %, or about 70 weight % to about 88 weight %. In some embodiments, the cathode electrode film can comprise up to about 10 weight % of the porous carbon material, including up to about 5 weight %, or about 1 weight % to about 5 weight %. In some embodiments, the cathode electrode film comprises up to about 5 weight %, including about 1 weight % to about 3 weight %, of the conductive additive. In some embodiments, the cathode electrode film comprises up to about 20 weight % of the binder, for example, about 1.5 weight % to 10 weight %, about 1.5 weight % to 5 weight %, or about 1.5 weight % to 3 weight %. In some embodiments, the cathode electrode film comprises about 1.5 weight % to about 3 weight % binder.

In some embodiments, an anode electrode film may comprise an active material, a binder, and optionally a conductive additive. In some embodiments, the conductive additive may comprise a conductive carbon additive, such as carbon black. In some embodiments, the active material of the anode may comprise a graphitic carbon, synthetic graphite, natural graphite, hard carbon, soft carbon, graphene, mesoporous carbon, silicon, silicon oxides, tin, tin oxides, germanium, lithium titanate, mixtures, or composites of the aforementioned materials. In some embodiments, an anode electrode film can include about 80 weight % to about 98 weight % of the active material, including about 90 weight % to about 98 weight %, or about 94 weight % to about 97 weight %. In some embodiments, the anode electrode film comprises up to about 5 weight %, including about 1 weight % to about 3 weight %, of the conductive additive. In some embodiments, the anode electrode film comprises up to about 20 weight % of the binder, including about 1.5 weight % to 10 weight %, about 1.5 weight % to 5 weight %, or about 3 weight % to 5 weight %. In some embodiments, the anode electrode film comprises about 4 weight % binder. In some embodiments, the anode film may not include a conductive additive.

In some embodiments, the electrode film of a lithium ion energy storage device electrode comprises an electrode film mixture comprising carbon configured to reversibly intercalate lithium ions. In some embodiments, the lithium intercalating carbon is selected from a graphitic carbon, graphite, hard carbon, soft carbon and combinations thereof. For example, the electrode film of the electrode can include a binder material, one or more of graphitic carbon, graphite, graphene-containing carbon, hard carbon and soft carbon, and an electrical conductivity promoting material. In some embodiments, an electrode is mixed with lithium metal and/or lithium ions.

In further embodiments, the energy storage device 100 is charged with a suitable lithium-containing electrolyte. For example, device 100 can include a lithium salt, and a solvent, such as a non-aqueous or organic solvent. Generally, the lithium salt includes an anion that is redox stable. In some embodiments, the anion can be monovalent. In some embodiments, a lithium salt can be selected from hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), lithium bis(oxalato)borate ($LiB(C_2O_4)_2$), lithium bis(fluorosulfonyl)imide ($LiN(SO_2F)_2$), lithium difluoro(oxalato)borate ($LiC_2BF_2O_4$) and combinations thereof. In some embodiments, the electrolyte can include a quaternary ammonium cation and an anion selected from the group consisting of hexafluorophosphate, tetrafluoroborate and iodide. In some embodiments, the salt concentration can be about 0.1 mol/L (M) to about 5 M, about 0.2 M to about 3 M, or about 0.3 M to about 2 M. In further embodiments, the salt concentration of the electrolyte can be about 0.7 M to about 1 M. In certain embodiments, the salt concentration of the electrolyte can be about 0.2 M, about 0.3 M, about 0.4 M, about 0.5 M, about 0.6 M, about 0.7 M, about 0.8 M. about 0.9 M, about 1 M, about 1.1 M, about 1.2 M, 1.3M, 1.4M, 1.5M or values therebetween.

In some embodiments, an energy storage device can include a liquid solvent. The solvent need not dissolve every component, and need not completely dissolve any component, of the electrolyte. In further embodiments, the solvent can be an organic solvent. In some embodiments, a solvent can include one or more functional groups selected from carbonates, ethers and/or esters. In some embodiments, the solvent can comprise a carbonate. In further embodiments, the carbonate can be selected from cyclic carbonates such as, for example, ethylene carbonate (EC), propylene carbonate (PC), vinyl ethylene carbonate (VEC), vinylene carbonate (VC), fluoroethylene carbonate (FEC), and combinations thereof, or acyclic carbonates such as, for example, dimethyl carbonate (DMC), diethyl carbonate (DEC), ethyl methyl carbonate (EMC), and combinations thereof. In certain embodiments, the electrolyte can comprise LiPF$_6$, and one or more carbonates.

In some embodiments, the active material includes a treated carbon material, where the treated carbon material includes a reduction in a number of hydrogen-containing functional groups, nitrogen-containing functional groups and/or oxygen-containing functional groups, as described in U.S. Patent Publication No. 2014/0098464. For example, the treated carbon particles can include a reduction in a number of one or more functional groups on one or more surfaces of the treated carbon, for example about 10% to about 60% reduction in one or more functional groups compared to an untreated carbon surface, including about 20% to about 50%. The treated carbon can include a reduced number of hydrogen-containing functional groups, nitrogen-containing functional groups, and/or oxygen-containing functional groups. In some embodiments, the treated carbon material comprises functional groups less than about 1% of which contain hydrogen, including less than about 0.5%. In some embodiments, the treated carbon material comprises functional groups less than about 0.5% of which contains nitrogen, including less than about 0.1%. In some embodiments, the treated carbon material comprises functional groups less than about 5% of which contains oxygen, including less than about 3%. In further embodiments, the treated carbon material comprises about 30% fewer hydrogen-containing functional groups than an untreated carbon material.

Multilayer Electrode Films

Some embodiments include compositions and methods for multilayer hybrid electrode films comprised of multiple active layers. In some embodiments, the multilayer hybrid electrode film comprises at least one dry cast electrode film and at least one wet cast electrode film. In some embodiments, multilayer electrode film comprises a dry cast electrode film and a wet cast electrode film are directly disposed over each other such that the dry cast electrode film and the wet cast electrode film are in direct contact with each other. In some embodiments, the multiple active layers comprise at least one additional layer. In some embodiments, the additional layer is an intermediate layer disposed between the dry cast and wet cast electrode films. In some embodiments, the additional layer is disposed over both the wet and dry processed electrode films. In some embodiments, the additional layer comprises at least one of a composite powder, a composite powder paste, a composite film and/or an adhesive paste. In some embodiments, the additional layer is a multilayer additional layer.

Figure 2A:
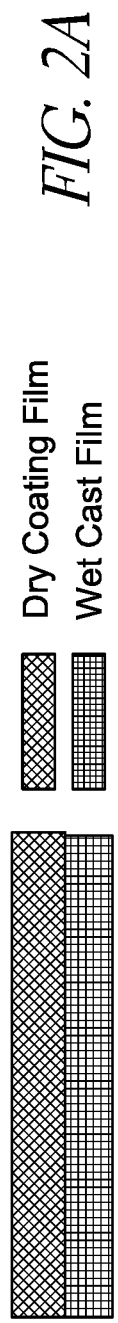
FIGS. 2A-2C depict embodiments of dry coated and wet cast hybrid electrode film configurations that may comprise a composite powder or composite film.
Figure 2B:
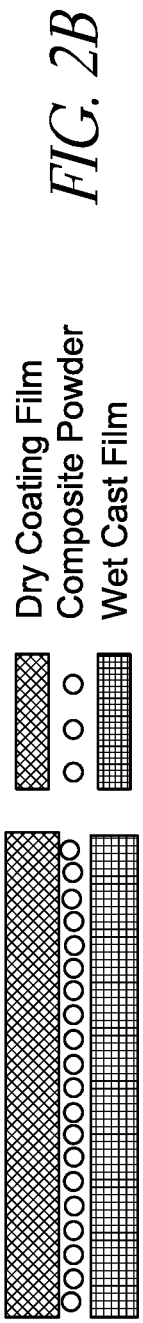
Figure 2C:

FIGS. 2A-2C depict embodiments of multilayer hybrid electrode films of a dry film/wet film configuration (FIG. 2A), dry film/composite powder/wet film configuration (FIG. 2B) and dry film/composite film/wet film configuration (FIG. 2C). In some embodiments, a composite powder comprises a powder selected from the group consisting of Si, SiO$_x$, Li$_x$SiO$_y$ alloy, Li, Li alloy, and combinations thereof. In some embodiments, a composite powder comprises at least one of Si, SiO$_x$, Li$_x$SiO$_y$ alloy, Li and Li alloy. In some embodiments, a composite powder comprises Si, SiO$_x$, Li$_x$SiO$_y$ alloy, Li and Li alloy. In some embodiments, a composite film is formed by wet casting of a composite powder slurry followed by a solvent evaporation.

Figure 3A:
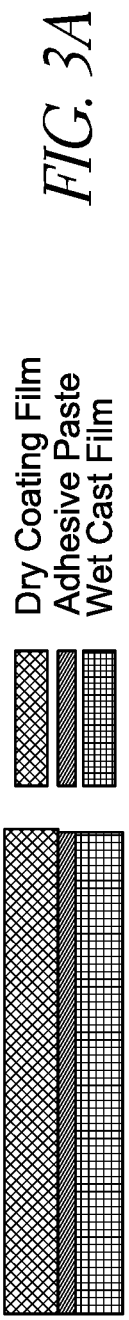
FIGS. 3A-3C depict embodiments of dry coated and wet cast hybrid electrode film configurations that comprise an adhesive paste, composite powder paste and/or composite film.
Figure 3B:
Figure 3C:
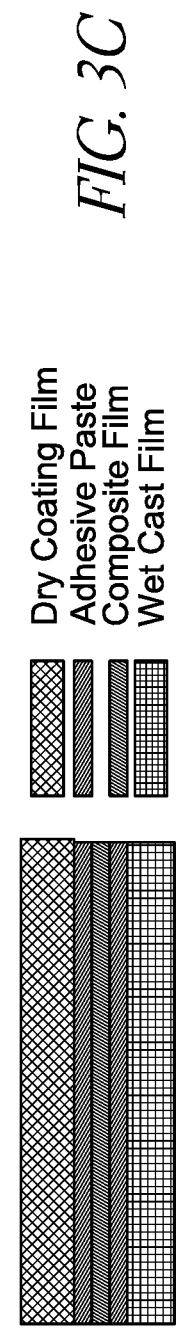

FIGS. 3A-3C depict embodiments of multilayer hybrid electrode films configurations that comprise an adhesive paste (FIG. 3A), a composite powder paste (FIG. 3B) and an adhesive paste with a composite film as a multilayer film (FIG. 3C). In some embodiments, an adhesive paste comprises an adhesive selected from the group consisting of a room temperature ionic liquid, a conductive carbon paste, a liquid polymer, and combinations thereof. In some embodiments, an adhesive paste comprises at least one of a room temperature ionic liquid, a conductive carbon paste and liquid polymer. In some embodiments, an adhesive paste comprises a room temperature ionic liquid, a conductive carbon paste and a liquid polymer. In some embodiments, a liquid polymer comprises a polymer, and further comprises at least one of a lithium salt and a ceramic filler. In some embodiments, a composite powder paste comprises a composite powder and an adhesive paste. In some embodiments, a composite powder paste comprises a composite powder suspended in at least one of a lithium ion electrolyte, a room temperature ionic liquid and a liquid polymer. In some embodiments, a composite powder paste further comprises a ceramic filler.

Table 1 provides possible hybrid electrode configurations. Table 2 provides possible single layer electrode hybrid cell configurations. Table 3 provides possible multilayer electrode hybrid cell configurations.

TABLE 1

Multilayer Hybrid Electrode Configurations

| Configuration | Dry Cathode Film | Dry Anode Film | Wet Cathode | Wet Anode |
|---|---|---|---|---|
| Electrode A |  | X |  | X |
| Electrode B | X |  | X |  |

TABLE 2

Single Layer Hybrid Electrode Cell Configurations

| Configuration | Dry Cathode Film | Dry Anode Film | Wet Cathode | Wet Anode |
|---|---|---|---|---|
| Cell A |  | X | X |  |
| Cell B | X |  |  | X |

TABLE 3

Multilayer Hybrid Electrode Cell Configurations

| Configuration | Cell A | Cell B | Cell A | Cell B |
|---|---|---|---|---|
| Cell 1 |  | X |  | X |
| Cell 2 | X |  | X |  |
| Cell 3 |  |  | X | X |

Lamination of Multilayer Hybrid Electrode Films

FIGS. 4A-4C depict embodiments of the lamination of a dry film/wet film (FIG. 4A), a dry film/composite powder/wet film (FIG. 4B) and a dry film/composite film/wet film (FIG. 4C) multilayer hybrid electrode film by rolling between two rolls. Although select hybrid multilayer electrode film configurations are depicted in FIGS. 4A-4C, other hybrid multilayer electrode film configurations may also be laminated by such a rolling process. In some embodiments, rolling of the hybrid multilayer electrode film can be performed at a lamination temperature of room temperature, at the melting point of at least one polymer binder or above the melting point of at least one polymer binder used in dry coated and/or wet cast film, or any range of values therebetween. In some embodiments, rolling of the hybrid multilayer electrode film can be carried out in an ambient environment, or a dry environment with low moisture.

FIGS. 5A-5C depict embodiments of the lamination of a dry film/wet film (FIG. 5A), a dry film/composite powder/wet film (FIG. 5B) and a dry film/composite film/wet film (FIG. 5C) multilayer hybrid electrode film by rolling between a roll and a moving station. Although select hybrid multilayer electrode film configurations are depicted in FIGS. 5A-5C, other hybrid multilayer electrode film configurations may also be laminated by such a rolling process. In some embodiments, rolling of the hybrid multilayer electrode film can be performed at a lamination temperature of room temperature, at the melting point of at least one polymer binder or above the melting point of at least one polymer binder used in dry coated and/or wet cast film, or any range of values there between. In some embodiments, rolling of the hybrid multilayer electrode film can be carried out in an ambient environment, or a dry environment with low moisture.

Figures 6A, 6B, 6C:
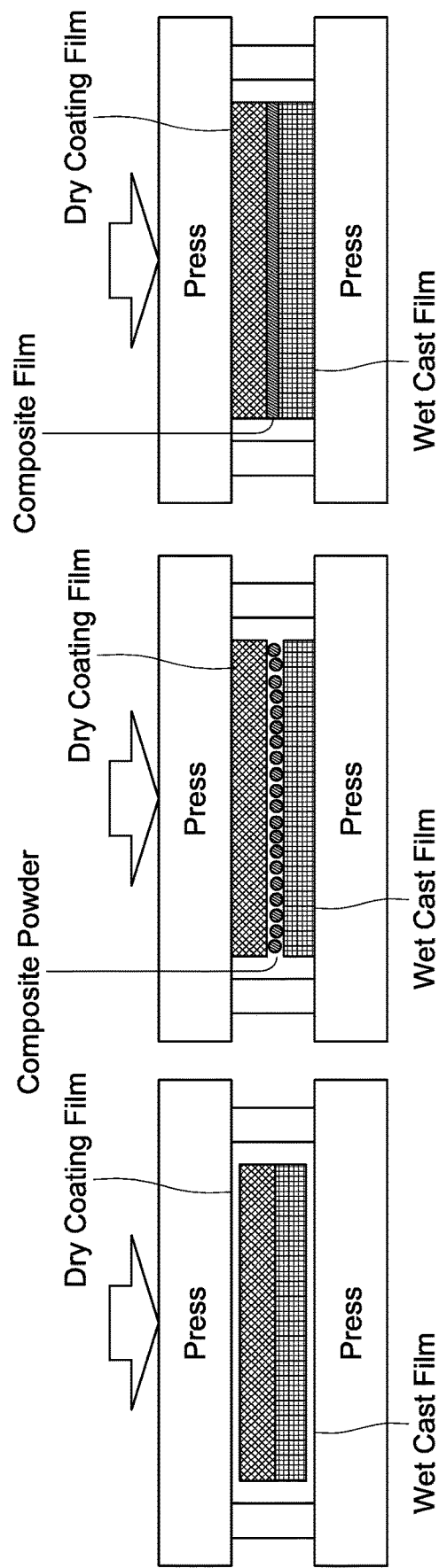
FIGS. 6A-6C depict embodiments of the lamination of dry coat film and wet cast film hybrid electrode film configurations by pressing between two plates.

FIGS. 6A-6C depict embodiments of the lamination of a dry film/wet film (FIG. 6A), a dry film/composite powder/wet film (FIG. 6B) and a dry film/composite film/wet film (FIG. 6C) multilayer hybrid electrode film by pressing between two plates, respectively. Although select hybrid multilayer electrode film configurations are depicted in FIGS. 6A-6C, other hybrid multilayer electrode film configurations may also be laminated by such a pressing process. In some embodiments, pressing of the hybrid multilayer electrode film can be performed at a lamination temperature of room temperature, at the melting point of at least one polymer binder or above the melting point of at least one polymer binder used in dry coated and/or wet cast film, or any range of values there between. In some embodiments, pressing of the hybrid multilayer electrode film can be carried out in an ambient environment, or a dry environment with low moisture.

Figure 7A:
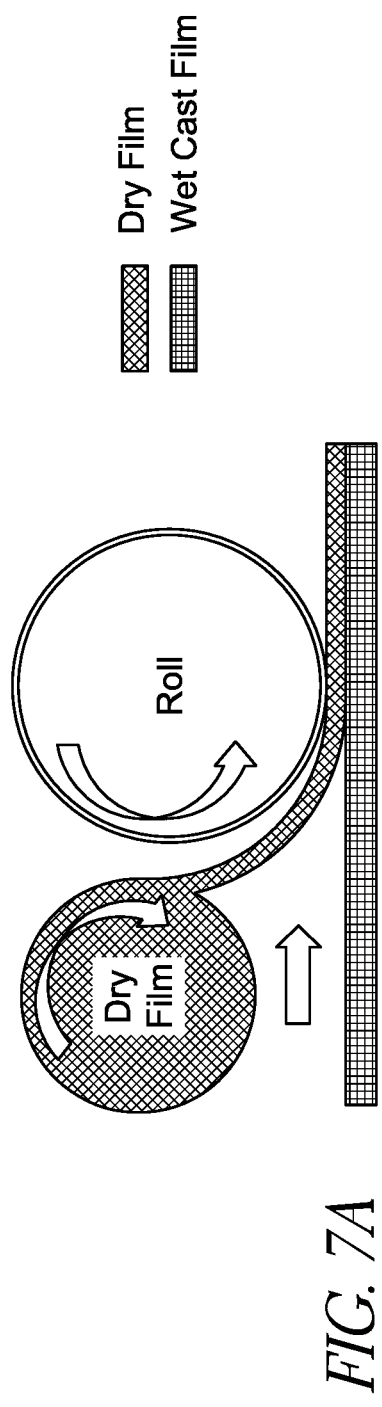
FIGS. 7A-7C depict embodiments of the lamination of dry coat film and wet cast film hybrid electrode film configurations by continuous roll-to-roll coating.
Figure 7B:
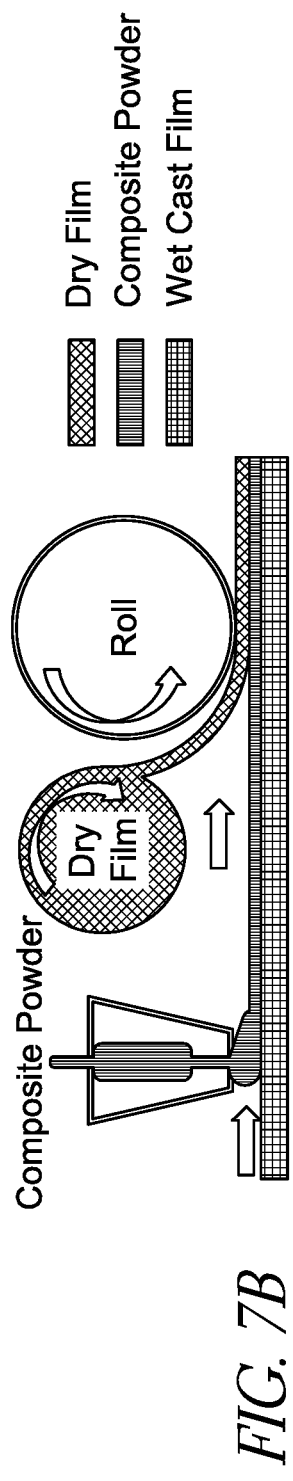
Figure 7C:
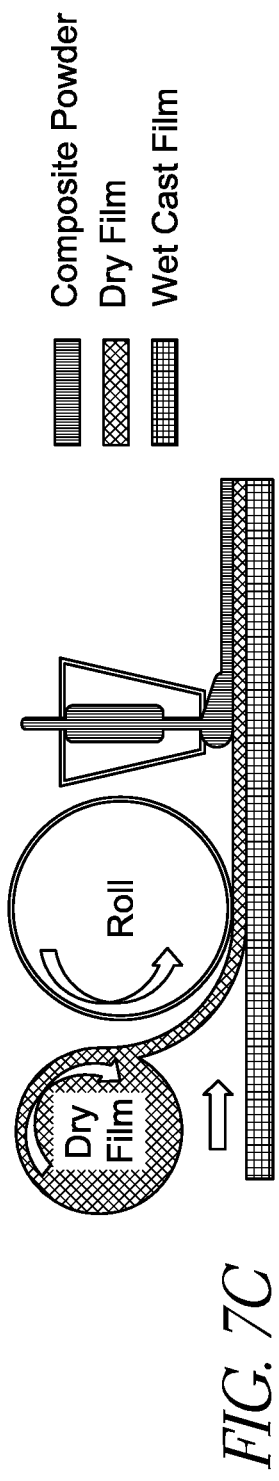

FIGS. 7A-7C depict embodiments of the lamination of a dry film/wet film (FIG. 7A), a dry film/composite powder/wet film (FIG. 7B) and a composite powder/dry film/wet film (FIG. 7C) multilayer hybrid electrode configuration by continuous roll-to-roll coating, respectively. FIG. 7A depicts unrolling and depositing a dry-processed film over a wet-processed film, and subsequently roll laminating the multilayer film. FIG. 7B depicts depositing a composite powder over the wet-processed film, unrolling and depositing a dry-processed film over the deposited composite powder, and subsequently roll laminating the multilayer film. In some embodiments, the additional layer is deposited over the dry-processed film, the wet-processed film is deposited over the deposited additional layer, and the multilayer film is subsequently laminated. In some embodiments, the additional layer is deposited over the dry-processed film, an electrode film slurry mixture is deposited over the deposited additional layer, and the multilayer film is subsequently laminated. FIG. 7C depicts unrolling and depositing a dry-processed film over the wet-processed film, subsequently roll laminating the multilayer film, and depositing a composite powder over the laminated multilayer film. In some embodiments, the additional layer is deposited directly over the dry-processed film. In some embodiments, the additional layer is deposited directly over the wet-processed film. In some embodiments, the multilayer electrode film described herein (e.g. formed by the processes described herein) is a free-standing multilayer electrode film.

Although select hybrid multilayer electrode film processes are depicted in FIGS. 7A-7C, other processes may also be utilized to form a hybrid multilayer electrode film. In some embodiments, an electrode film slurry mixture is deposited over a dry-processed (e.g. free-standing dry-processed) electrode film. In some embodiments, an additional layer and/or an additional layer material is deposited over a dry-processed (e.g. free-standing dry-processed) electrode film, and subsequently an electrode film slurry mixture is deposited over the additional layer and/or additional layer material. In some embodiments, an electrode film slurry mixture is deposited over a dry-processed (e.g. free-standing dry-processed) electrode film, and subsequently an additional layer and/or an additional layer material is deposited over the electrode film slurry mixture layer. In some embodiments, the deposited electrode film slurry mixture is dried to form a wet-processed electrode film. In some embodiments, the deposited electrode film slurry mixture is dried subsequently and/or consecutively to deposition of the electrode film slurry mixture. In some embodiments, lamination of the dry-processed and wet-processed electrode films is performed subsequently and/or consecutively to drying of the electrode film slurry mixture to form a multilayer electrode film. In some embodiments, the multilayer electrode film described herein (e.g. formed by the processes described herein) is a free-standing multilayer electrode film.

Although select hybrid multilayer electrode film configurations are depicted in FIGS. 7A-7C, other hybrid multilayer electrode film configurations may also be laminated by such a rolling process. In some embodiments, rolling of the hybrid multilayer electrode film can be performed at a lamination temperature of room temperature, at the melting point of at least one polymer binder or above the melting point of at least one polymer binder used in dry coated and/or wet cast film, or any range of values there between. In some embodiments, rolling of the hybrid multilayer electrode film can be carried out in an ambient environment, or a dry environment with low moisture. In some embodiments, the multilayer film may be heated and dried before and/or after lamination. It is to be understood that although FIGS. 7B and 7C depict the use of composite powders, other additional layer materials may be utilized.

Figure 8:
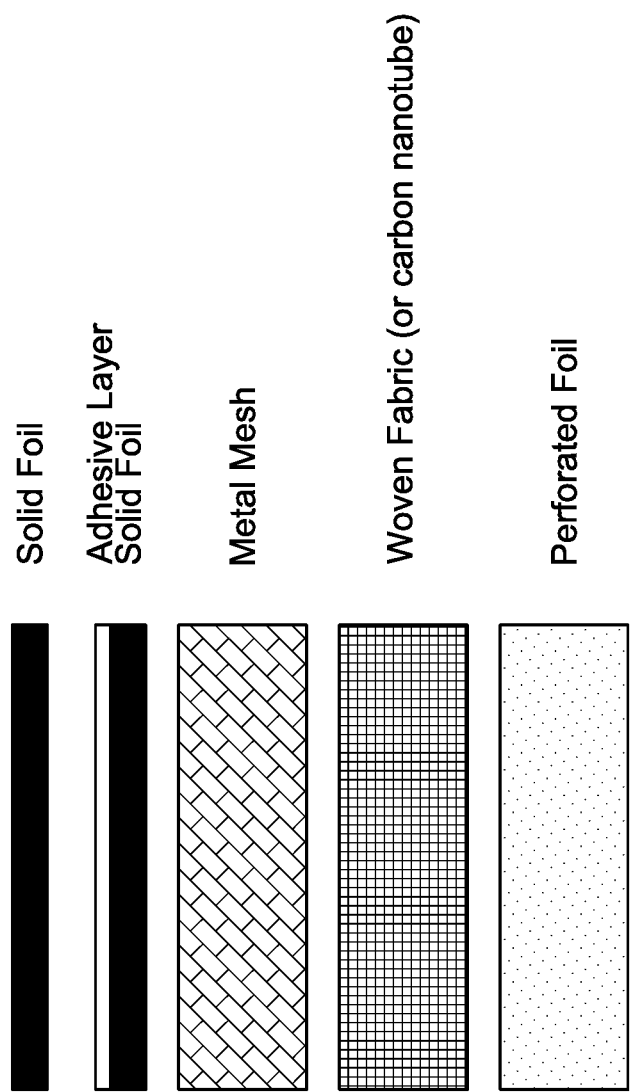
FIG. 8 depicts a number of current collectors that may be laminated with hybrid electrode films to form an electrode.

FIG. 8 depicts solid foil, adhesive layer/solid foil, metal, woven fabric or carbon nanotube, and perforated foil current collectors that may be laminated with hybrid electrode films to form an electrode. Lamination of these or other current collectors with the multilayer hybrid electrode films may be performed concurrently with or subsequent to the lamination of the dry and wet electrodes in forming the multilayer hybrid electrodes, for example the lamination processes depicted in FIGS. 4A-7C.

EXAMPLES

Dry Coated Electrode Films

Dry coated and free-standing $LiNi_{0.6}Mn_{0.2}Co_{0.2}O_2$ (NMC622) and graphite electrode films were produced with the specifications provide in Table 4.

TABLE 4

Specifications of Dry Coated NMC622 and Graphite Electrode Films

| | NMC622 | Graphite |
|---|---|---|
| Active content | 95 wt % | 96.15 wt % |
| Coating loading | 35 mg/cm$^2$ | 18 mg/cm$^2$ |
| Coating thickness | 120 μm | 116 μm |

Wet Cast Electrode Films

Wet cast $LiNi_{0.5}Mn_{0.3}Co_{0.2}O_2$ (NMC532) and graphite, purchased from MTI Corp., electrode films were produced with the specifications provided in Table 5.

TABLE 5

Specifications of Wet Cast NMC532 and Graphite Electrode Films

|  | NMC532 | Graphite |
|---|---|---|
| Active content | 94.2 wt % | 94.5 wt % |
| Coating loading | 12.1 mg/cm$^2$ | 8 mg/cm$^2$ |
| Coating thickness | 45 µtm | 41 µm |

Electrochemical Characterization of Assembled Cell

Dry coated film and wet cast electrode films were dried at about 110° C. under vacuum overnight prior to cell assembly. Li ion electrolytes comprised of EC:EMC:DMC:PC:VC (38.29:16.17:4.56:1 by wt. %) and 1.15M $LiPF_6$ were used for battery cell testing. Electrode dimension used for electrochemical testing were 53 mm and 54 mm for the cathode and anode, respectively. Cell assembly was carried out in an argon-filled glove box, and electrochemical measurement was performed at room temperature (about 21° C.).

Figure 9A:
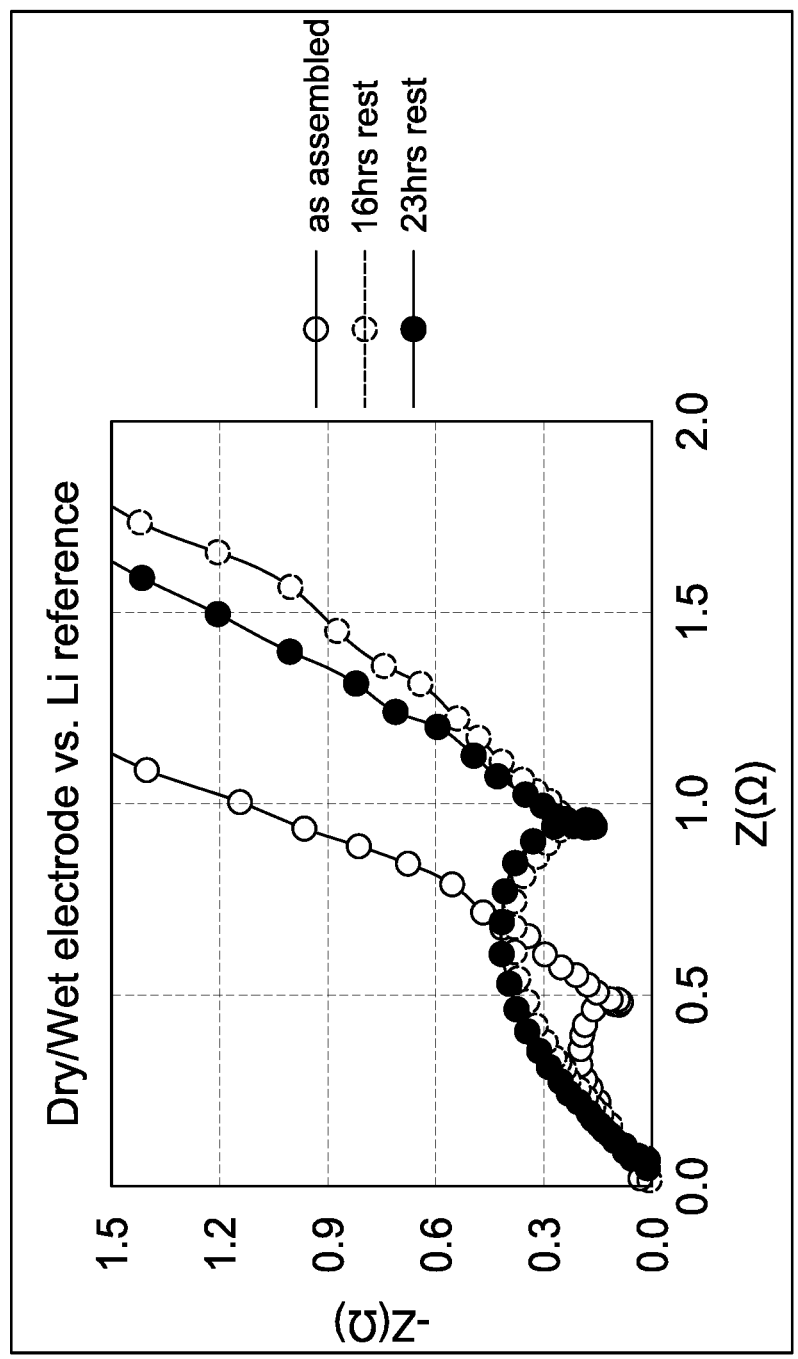
FIG. 9A provides a chart showing impedance spectroscopy results of dry coated graphite/wet cast graphite hybrid electrode films vs. a Li reference electrode measured from three electrode half cells over a rest period prior to a formation cycle.
Figure 9B:
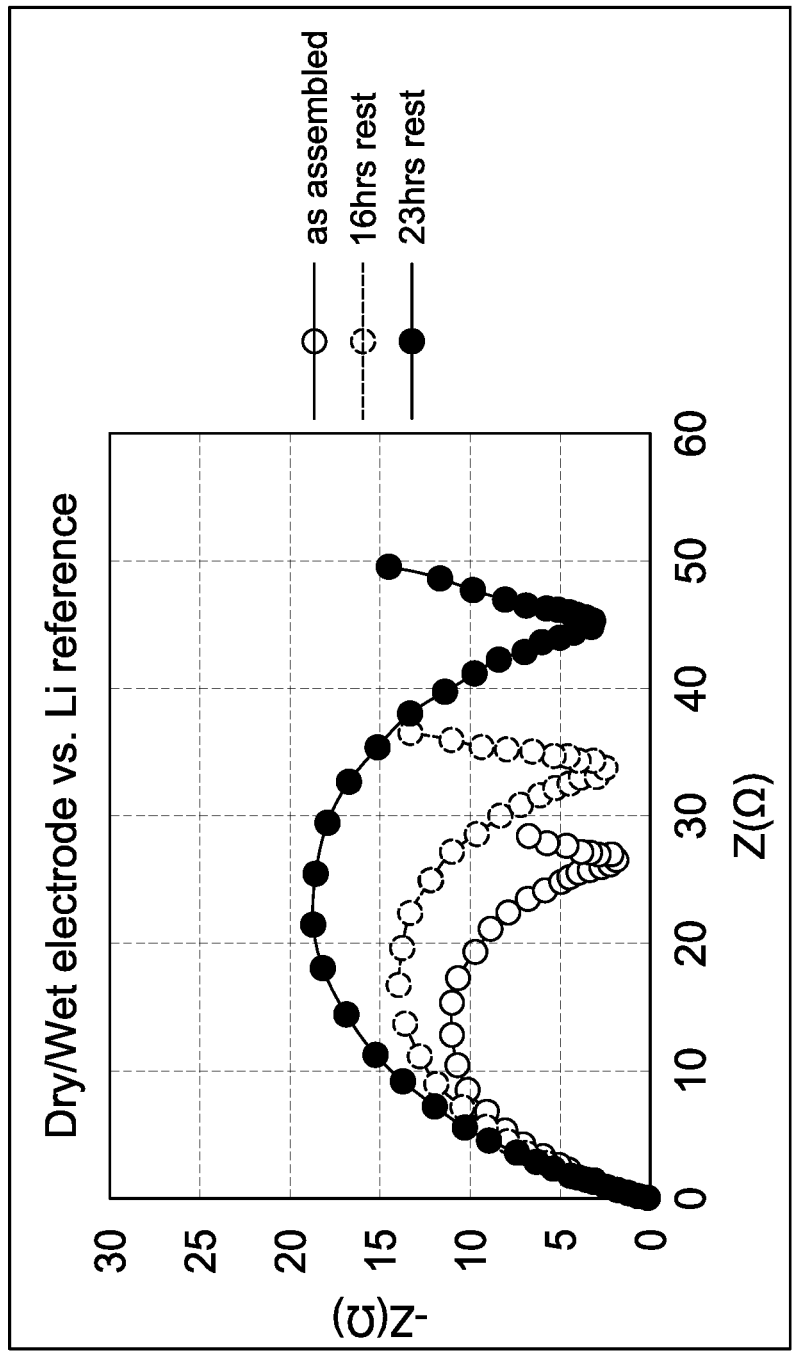
FIG. 9B provides a chart showing impedance spectroscopy results of dry coated graphite film/wet cast graphite film hybrid electrodes vs. a Li metal electrode measured from three electrode half cells over a rest period prior to a formation cycle.
Figure 9C:
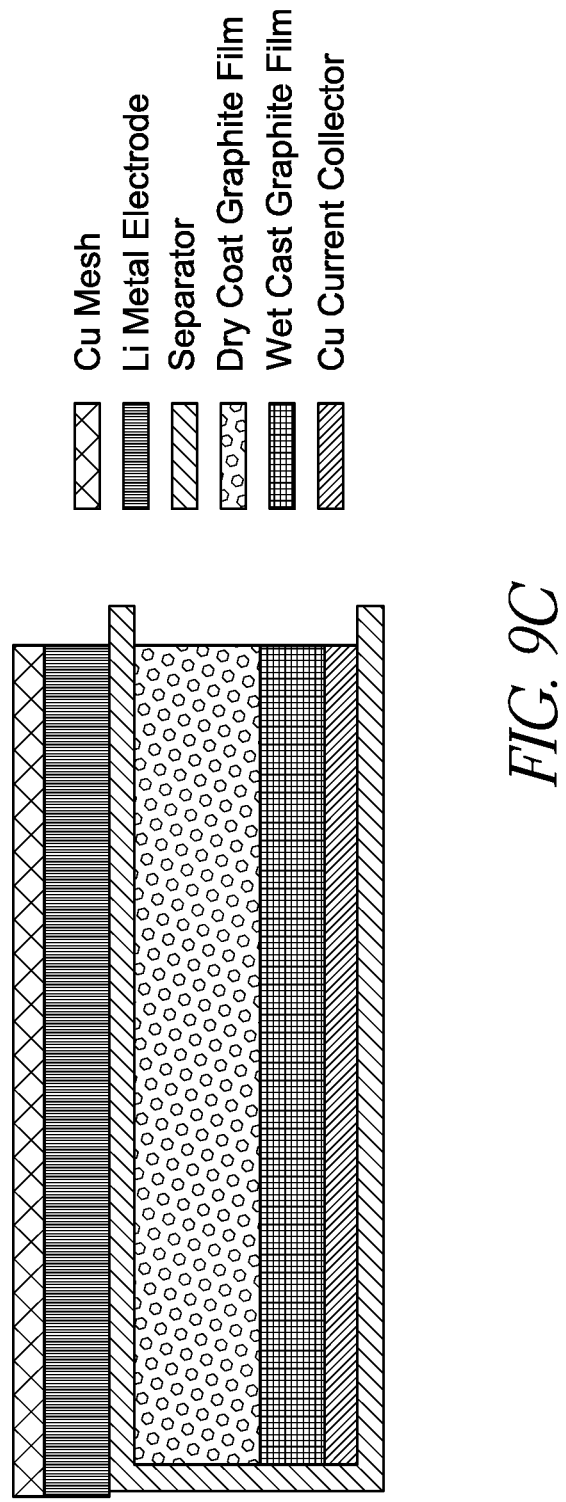
FIG. 9C depicts the hybrid anode electrode pouch cell configuration.

As seen in FIG. 9A, the initial impedance of the dry coated graphite film/wet cast graphite hybrid electrode film is relatively small, but the hybrid electrode impedance substantially increased over a 16 hour rest period and impedance growth was suppressed and stabilized during the rest of cell wetting period until 23 hours of rest. The impedance of dry coated film/wet cast hybrid electrode film against a Li reference shown in FIG. 9A demonstrates that impedance remains constant after 16 hr rest period, while that of the dry coat film/wet cast electrode/Li half-cell shown FIG. 9B demonstrates an impedance that is constantly growing due to the lithium metal electrode continuing to build up passivation layer on its surface. As such, as the hybrid multilayer graphite electrode remains constant as shown in FIG. 9A, FIG. 9B this indicates that the Li metal electrode is origin of large cell impedance growth over rest period.

Figure 10A:
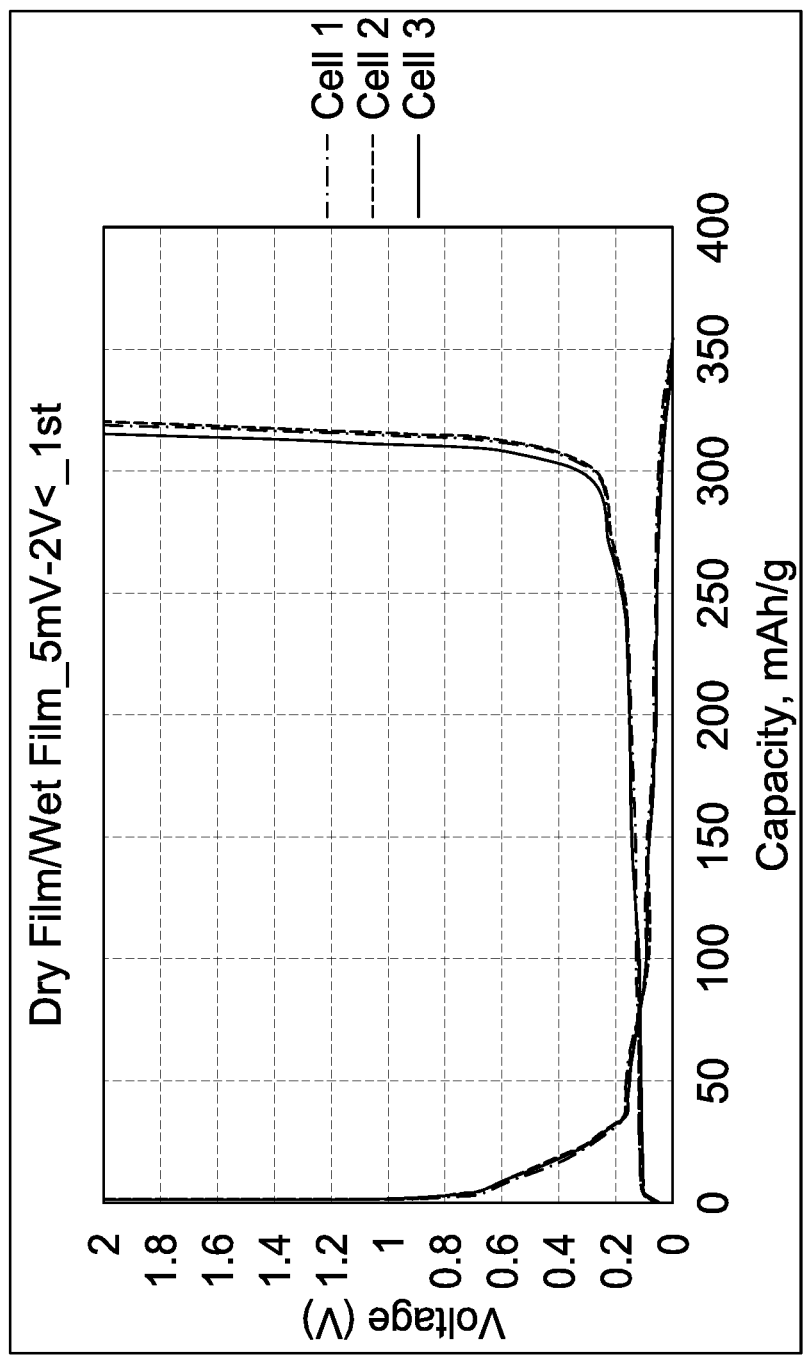
FIG. 10A provides a line chart showing the $1^{st}$ cycle voltage profile of dry coat graphite/wet cast graphite hybrid electrode films.
Figure 10B:
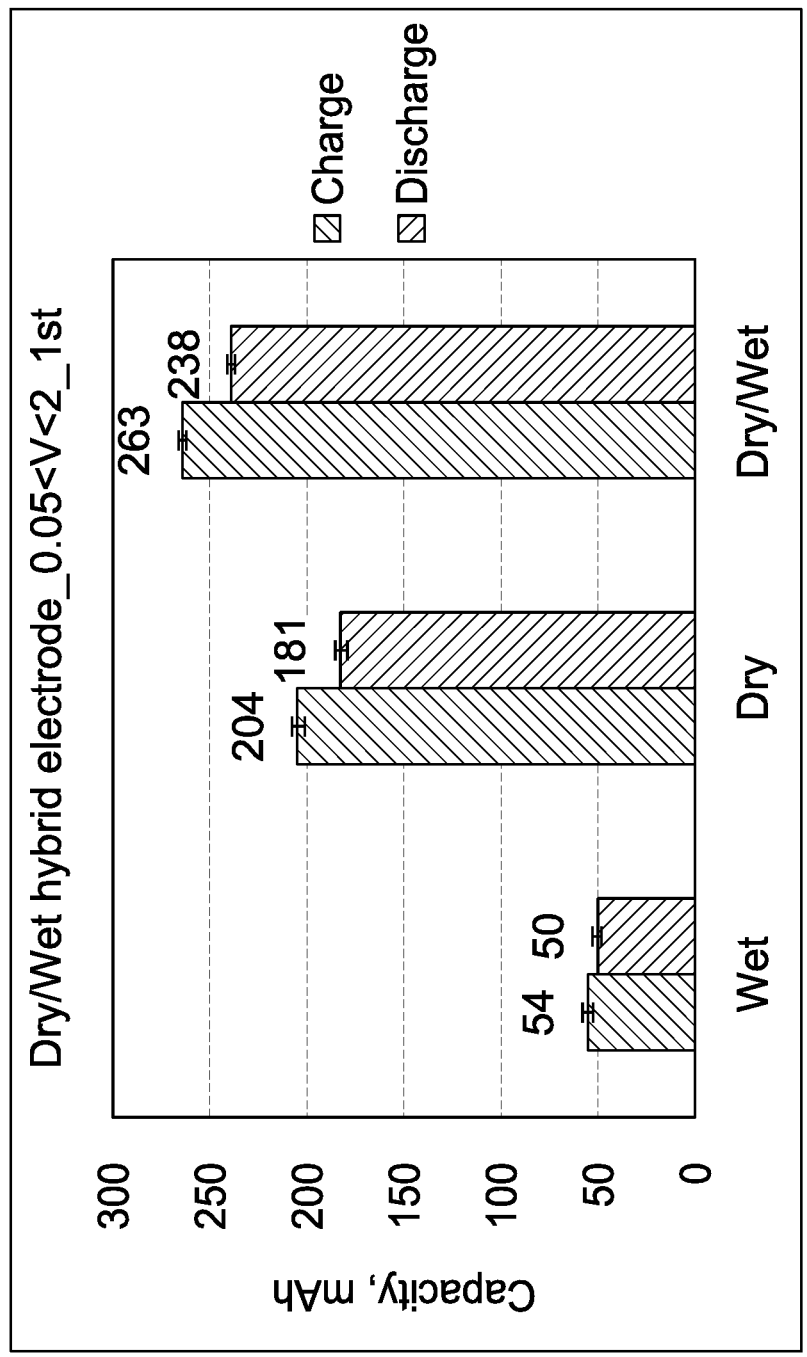
FIG. 10B provides a bar chart showing the charge and discharge capacities of wet graphite, dry graphite and dry coated graphite/wet cast graphite hybrid electrode film half-cells tested at a C/30 rate at $0.005<V<2$.
Figure 10C:
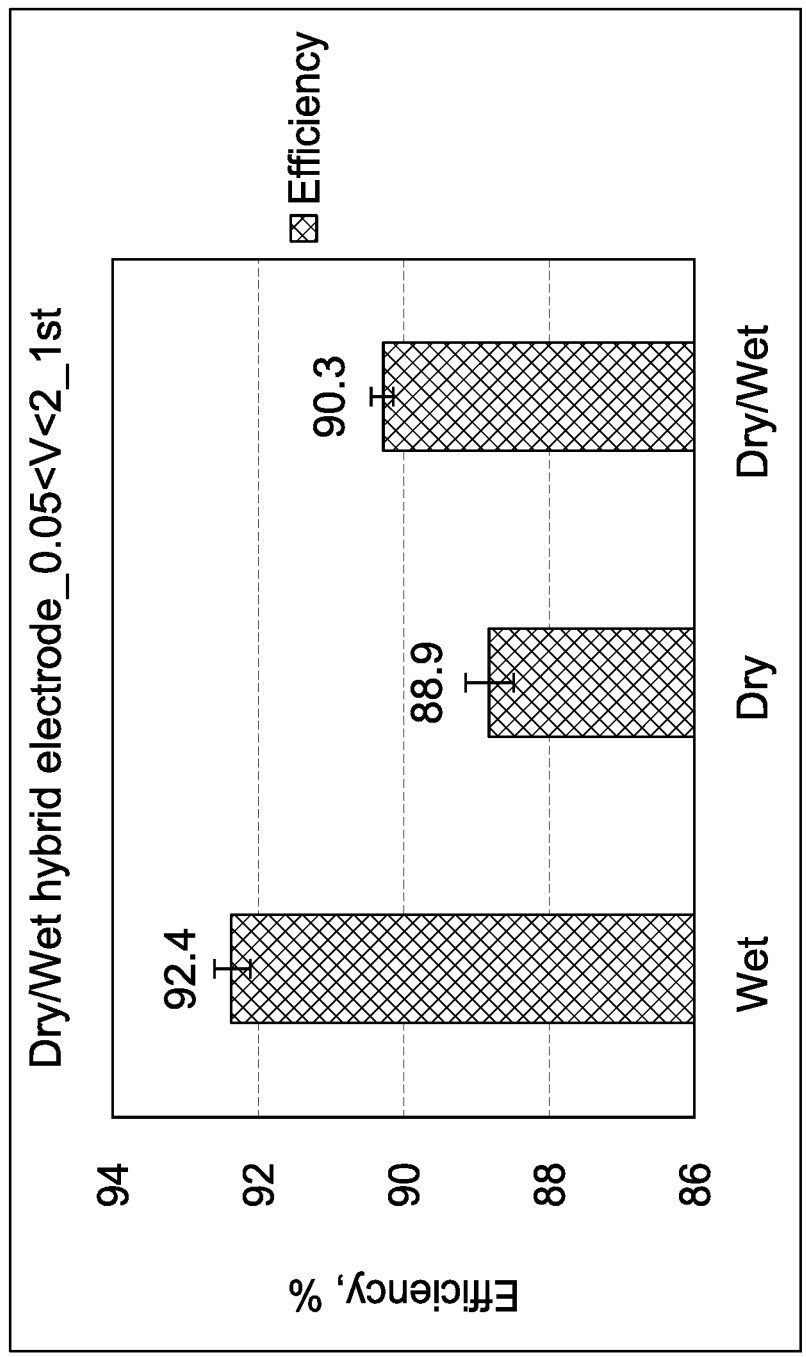
FIG. 10C provides a bar chart showing the efficiencies of wet graphite, dry graphite and dry coated graphite/wet cast graphite hybrid electrode film half-cells tested at a C/30 rate at $0.005<V<2$.

FIG. 10A shows the voltage profiles of a dry graphite/wet graphite hybrid electrode film with well-defined charge and discharge plateaus at below 0.2V which is typical electrochemical behavior for graphite electrode. FIG. 10B presents charge and discharge capacities for a wet cast graphite film, a dry coated graphite and a dry graphite film/wet cast graphite hybrid electrode films, and demonstrated that the hybrid multilayer electrode film can deliver electrode capacities comparable to combined wet cast and dry coated electrode films or slightly improved over the wet cast and dry coated electrode films. Furthermore, FIG. 10C shows that the dry/wet hybrid anode electrode film demonstrates an improved 1$^{st}$ cycle coulombic efficiency compared with dry coated electrode film. As such, it is demonstrated that the hybrid multilayer electrode film can carry the combined capacities of the dry coated graphite and wet cast graphite films without degradation.

Figure 11A:
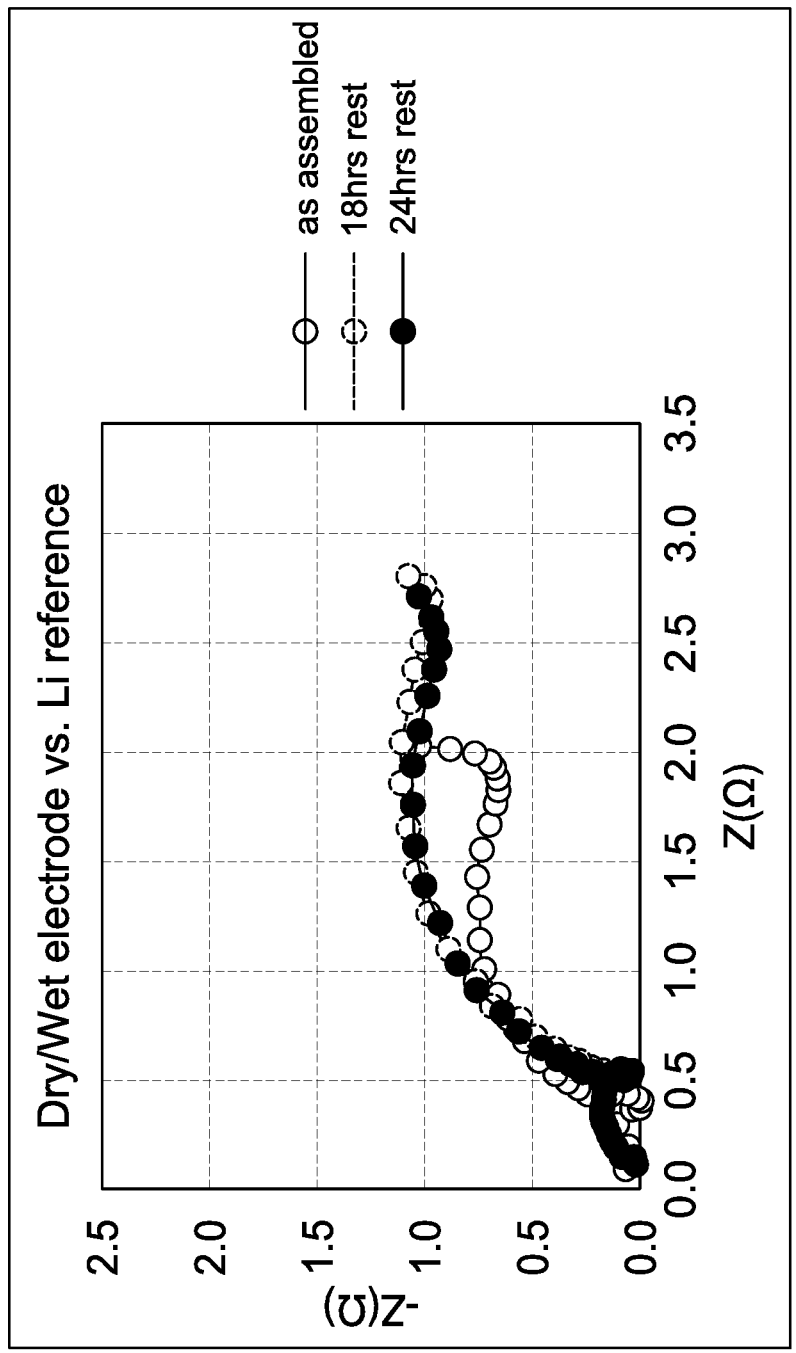
FIG. 11A provides a line chart showing impedance spectroscopy results of dry coated NMC622/wet cast NMC532 hybrid electrode films vs. a Li reference.
Figure 11B:
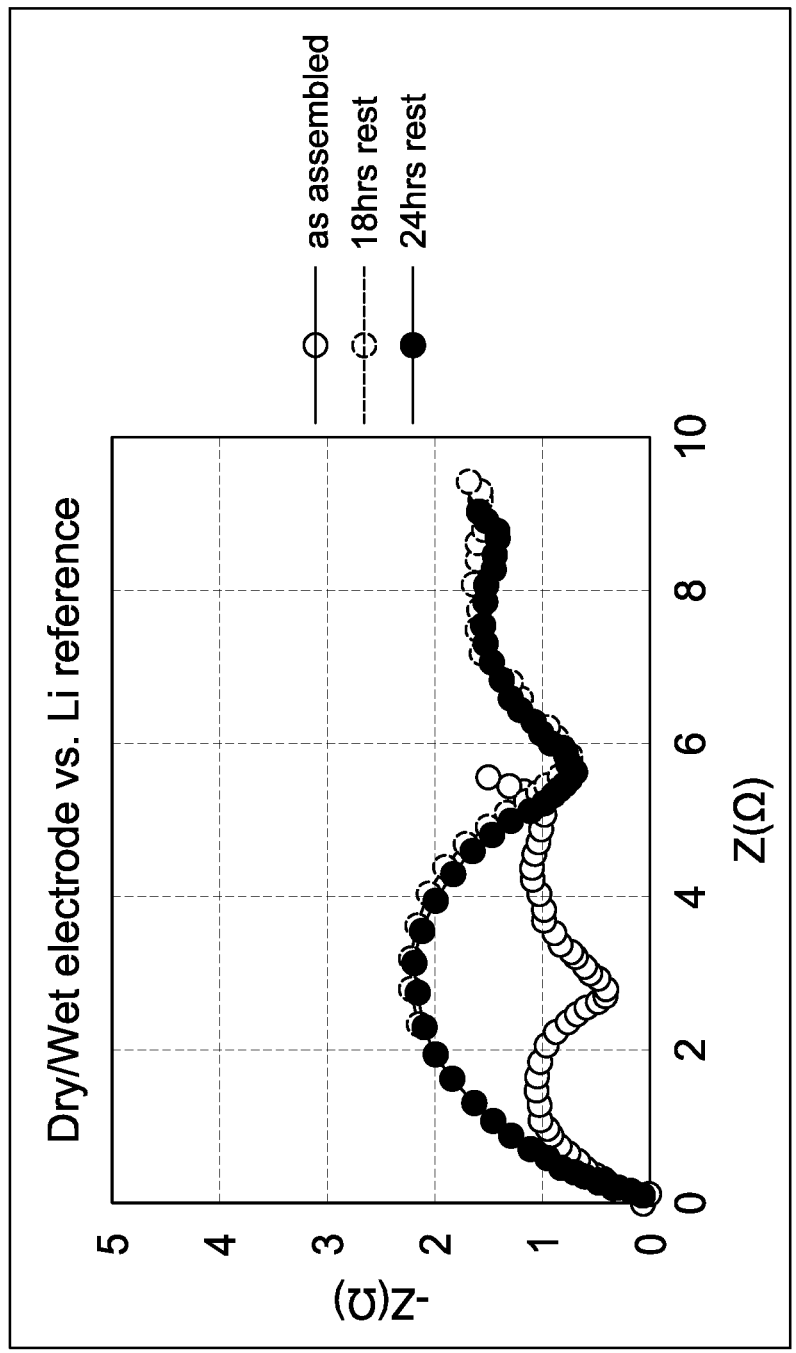
FIG. 11B provides a line chart showing impedance spectroscopy results of dry coated NMC622 film/wet cast NMC532 film hybrid electrodes vs. a Li metal electrode measured from three electrode half cells over a rest period prior to a formation cycle.
Figure 11C:
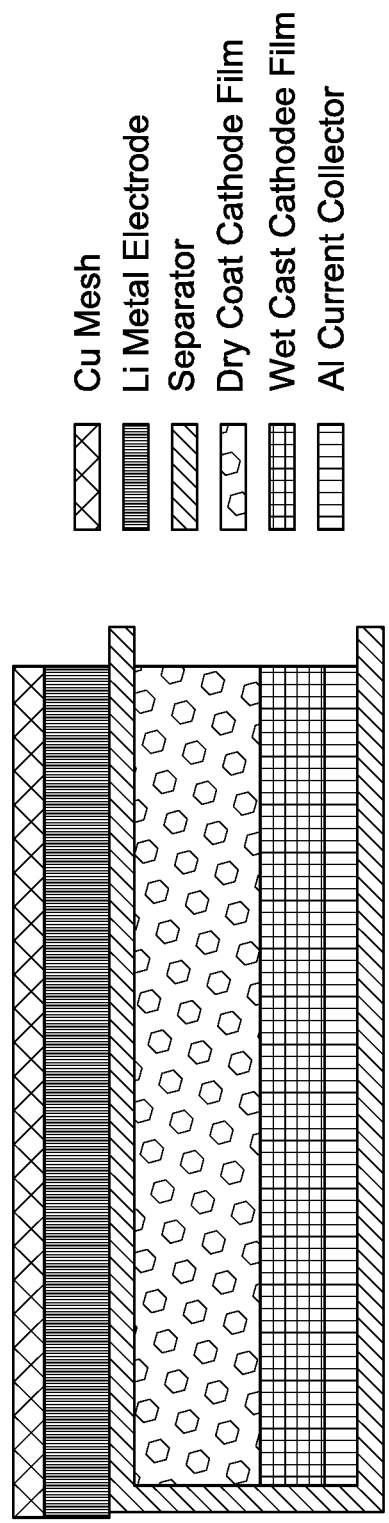
FIG. 11C depicts one embodiment of a hybrid cathode electrode pouch cell configuration.

FIGS. 11A and 11B demonstrate that impedance growth is occurred within 18 hours rest period for dry coated NMC622/wet cast NMC532 hybrid electrode films.

Figure 12A:
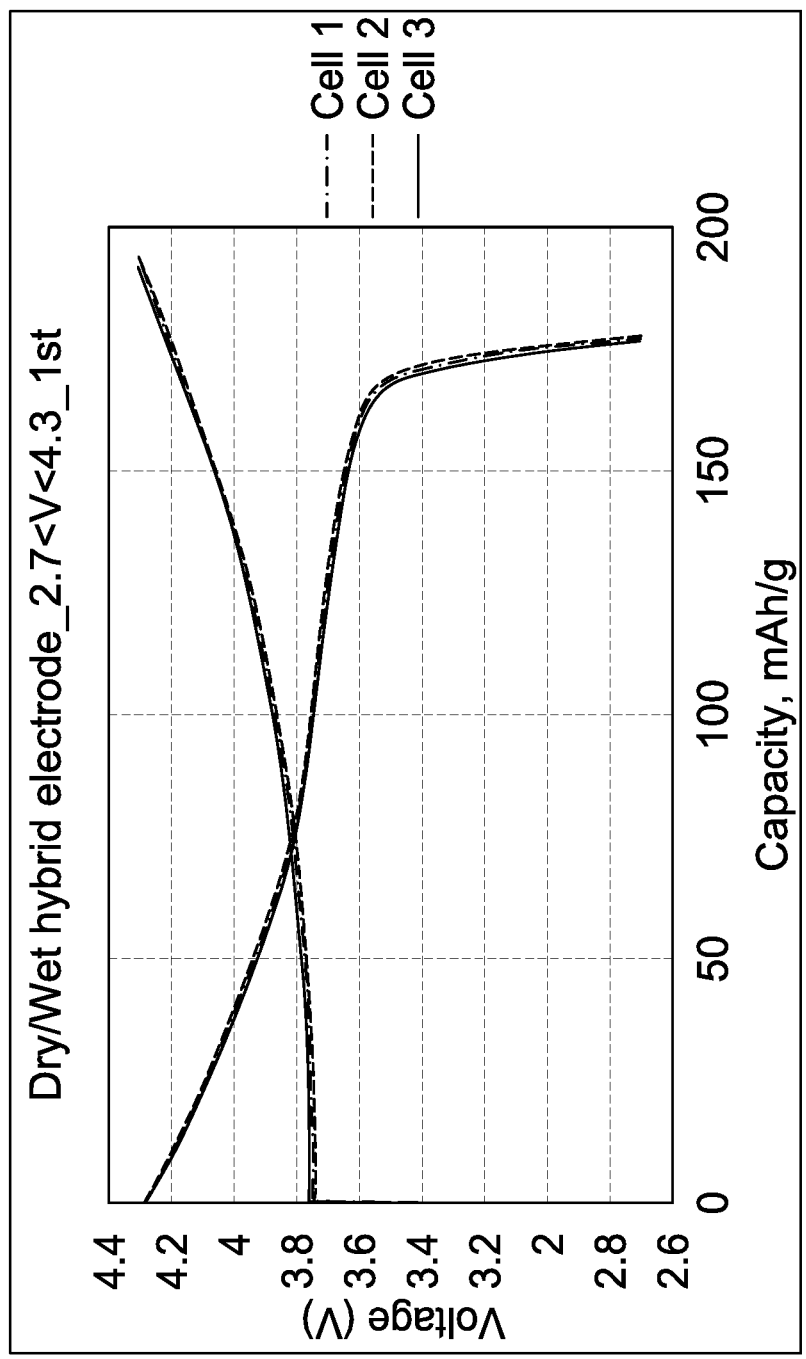
FIG. 12A provides a line chart showing the $1^{st}$ cycle voltage profile of dry coated NMC622/wet cast NMC532 hybrid electrode films.
Figure 12B:
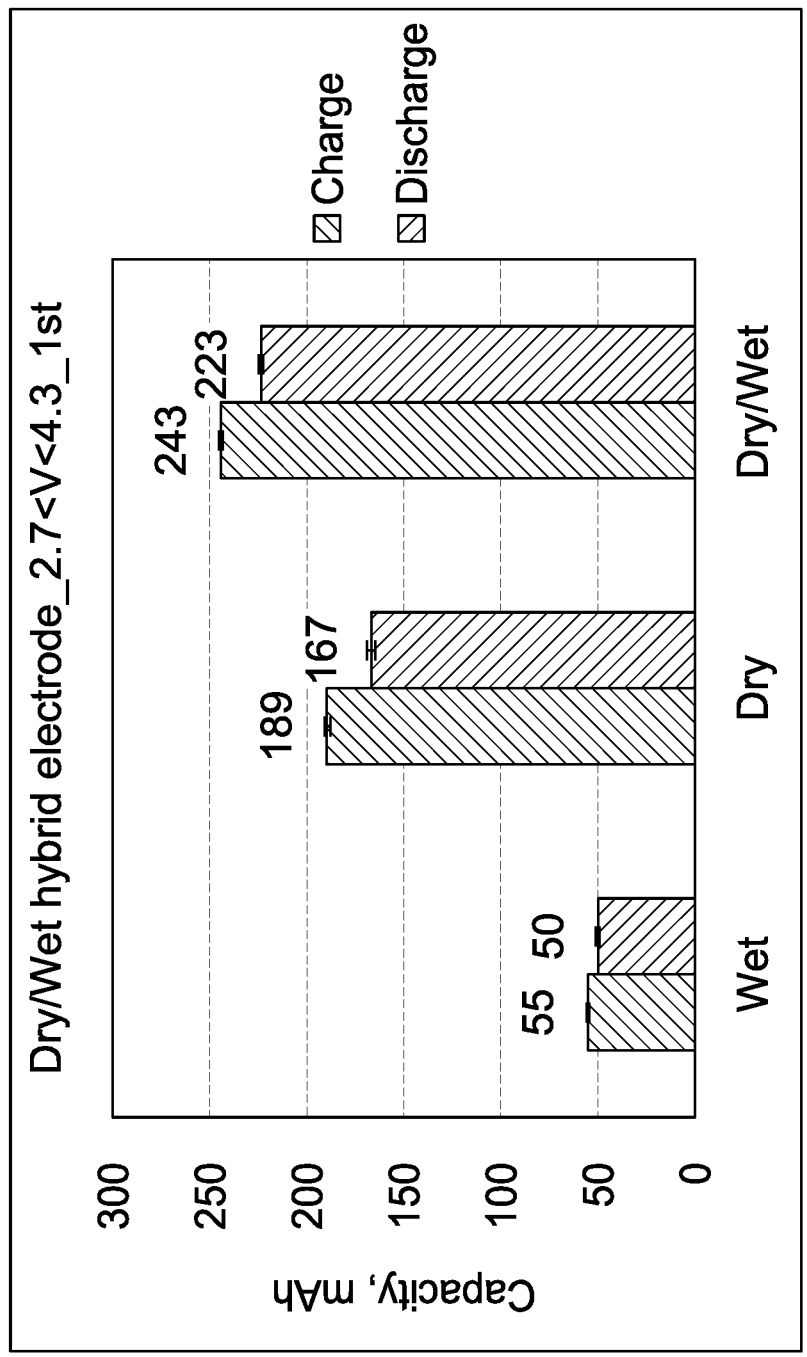
FIG. 12B provides a chart showing the charge and discharge capacities of wet NMC532, dry NMC622 and dry coated NMC622/wet cast NMC532 hybrid electrode film half-cells tested at a C/25 rate at $2.7<V<4.3$.
Figure 12C:
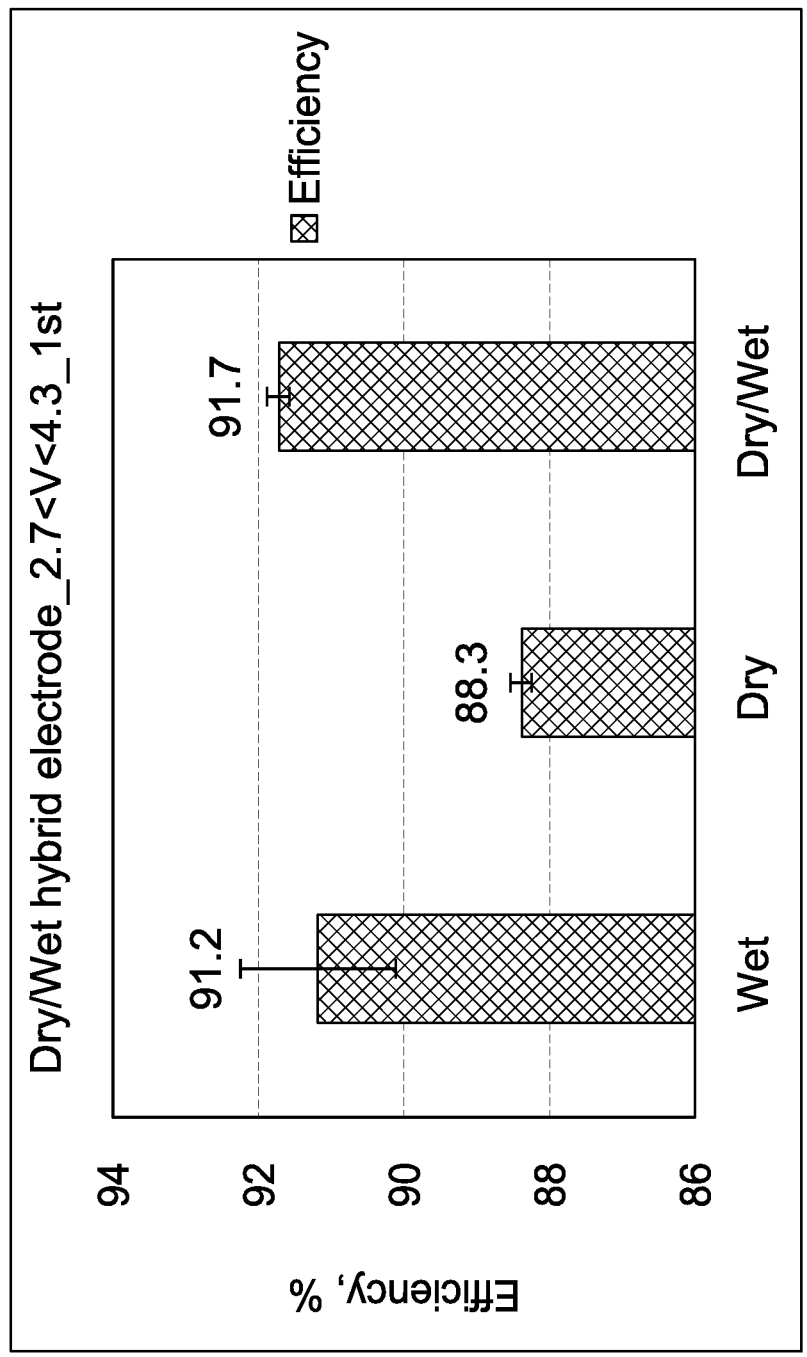
FIG. 12C provides a chart showing the efficiencies of wet NMC532, dry NMC622 and dry coated NMC622/wet cast NMC532 hybrid electrode film half-cells tested at a C/25 rate at $2.7<V<4.3$.

FIG. 12A shows the voltage profiles of dry coated NMC622/wet cast NMC532 hybrid electrode films. FIG. 12B demonstrates that dry coated NMC622/wet cast NMC532 hybrid electrode showed improved charge and voltage profiles of dry coated NMC622 electrode that delivered capac capacities improved over the wet cast and dry coated electrode films. Furthermore, FIG. 12C shows that the dry/wet hybrid cathode electrode film deomstrates coulombic improved 1$^{st}$ cycle coulombic efficiency over the dry coat NMC622 electrode film and comparable to the wet cast NMC532 electrode film.

Figure 13A:
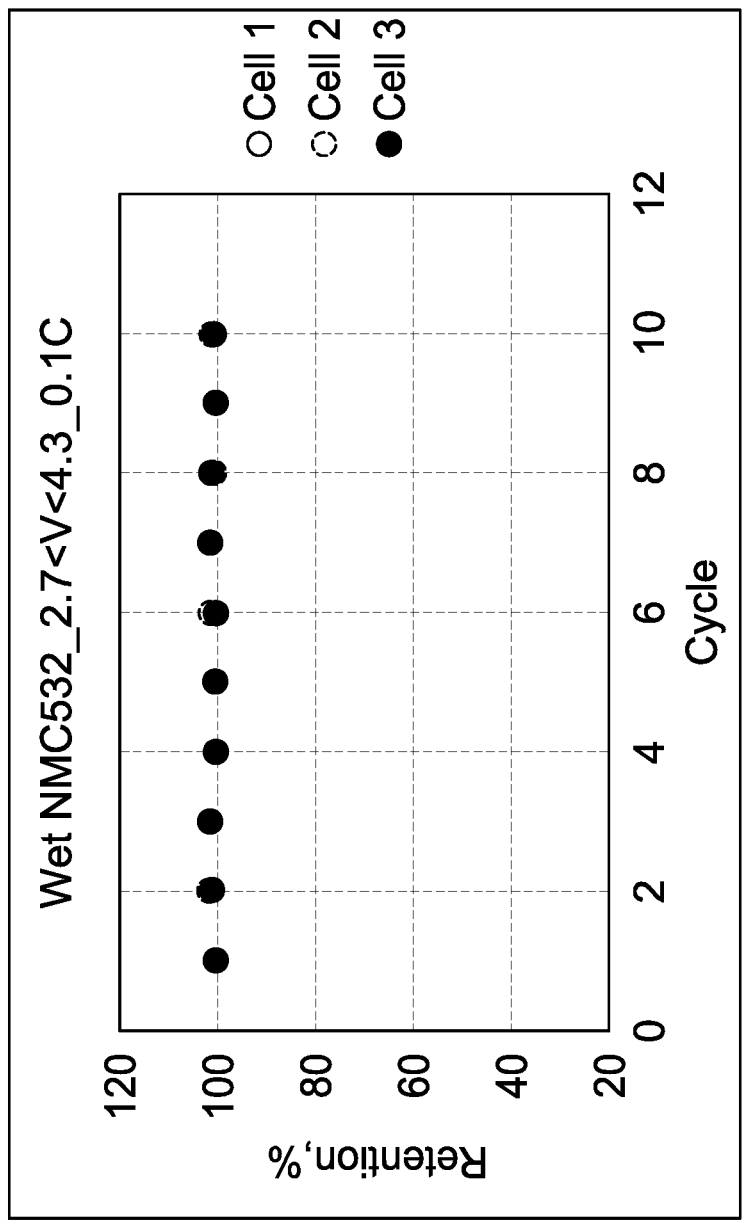
FIG. 13A provides a chart showing the capacity retention of wet cast NMC532 electrode film half-cells tested at a 0.1 C-rate at a voltage of $2.7<V<4.3$.
Figure 13B:
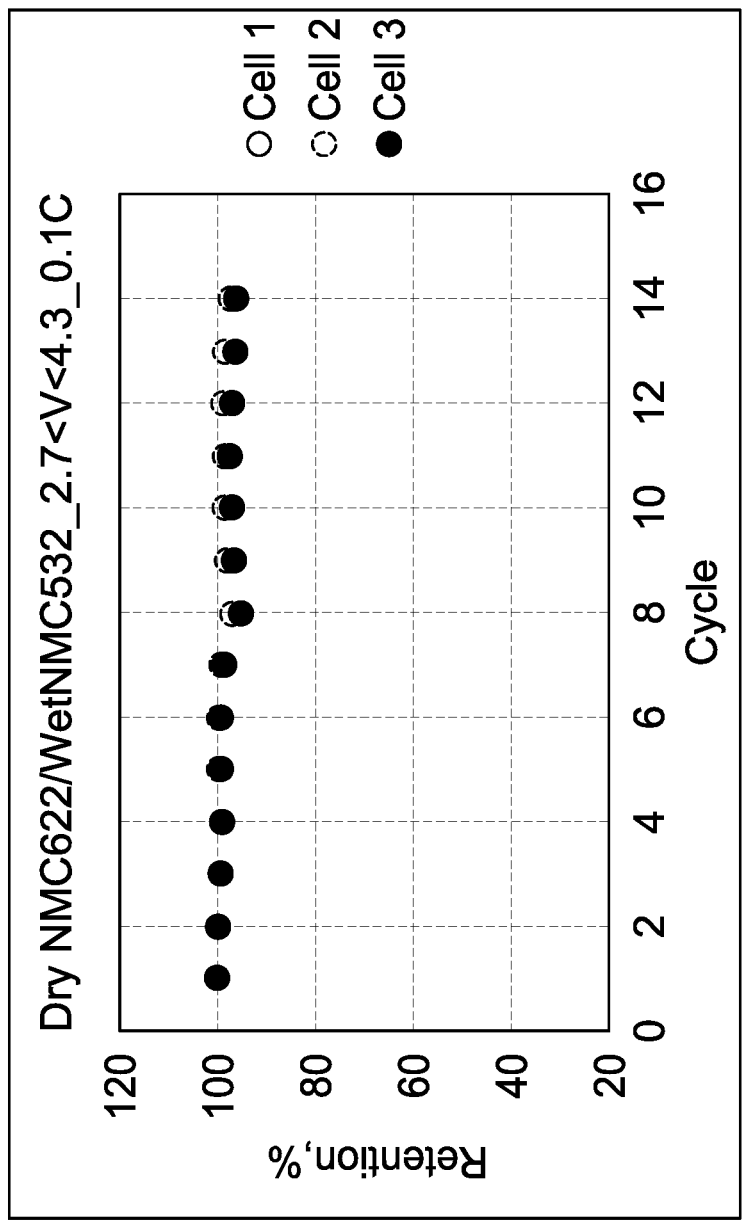
FIG. 13B provides a chart showing the capacity retention of dry coated NMC622/wet cast NMC532 hybrid electrode film half-cells tested at a 0.1 C-rate at a voltage of $2.7<V<4.3$.

FIG. 13A shows initial cycling behavior of wet cast NMC532 electrode films and FIG. 13B show initial cycling behavior of dry coated NMC622/wet cast NMC532 hybrid electrode film half cells both tested at 0.1 C rate. Both wet cast and hybrid electrodes exhibited stable capacity retention during initial 10 cycles, and demonstrated that the incorporation of a dry coated cathode film results in cycling performance comparable to the wet cast electrode film. Similar stable cycling performances were found for the hybrid graphite electrode film (not shown).

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount, depending on the desired function or desired result.

The headings contained in this document, if any, are for convenience only and do not necessarily affect the scope or meaning of the devices and methods disclosed herein.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A multilayer electrode film for use in an energy storage device comprising:
   a dry-processed active layer comprising:
      a first active material; and
      a fibrillized binder;
      wherein the dry-processed active layer is free-standing and absent of processing solvent residue; and
   a wet-processed active layer comprising:
      a second active material; and
      at least some processing solvent residue.

2. The multilayer electrode film of claim 1, wherein the dry-processed active layer and the wet-processed active layer are directly disposed over each other.

3. The multilayer electrode film of claim 1, further comprising an additional layer.

4. The multilayer electrode film of claim 3, wherein the additional layer is disposed over both the dry-processed active layer and the wet-processed active layer.

5. The multilayer electrode film of claim 3, wherein the additional layer is disposed between the dry-processed active layer and the wet-processed active layer.

6. The multilayer electrode film of claim 3, wherein the additional layer is a multilayer additional layer.

7. The multilayer electrode film of claim 3, wherein the additional layer is selected from the group consisting of a composite powder, a composite film, an adhesive paste, a composite powder paste, and combinations thereof.

8. The multilayer electrode film of claim 7, wherein the composite powder comprises a powder selected from the group consisting of Si, $SiO_x$, $Li_xSiO_y$ alloy, Li, Li alloy, and combinations thereof.

9. The multilayer electrode film of claim 7, wherein the composite film comprises a powder selected from the group consisting of Si, $SiO_x$, $Li_xSiO_y$ alloy, Li, Li alloy, and combinations thereof.

10. The multilayer electrode film of claim 7, wherein the adhesive paste comprises an adhesive selected from the group consisting of a room temperature ionic liquid, a conductive carbon paste, a liquid polymer, and combinations thereof.

11. The multilayer electrode film of claim 7, wherein the composite powder paste further comprises a ceramic filler.

12. The multilayer electrode film of claim 1, wherein the multilayer electrode film is free-standing.

13. An electrode comprising a current collector and the multilayer electrode film of claim 1.

14. A battery comprising the electrode of claim 13.

15. A multilayer electrode film fabrication process comprising:
   providing a dry-processed active layer comprising:
      a first active material; and
      a fibrillized binder;
      wherein the dry-processed active layer is free-standing and is absent of processing solvent residue; and
   providing a wet-processed active layer comprising:
      a second active material; and
      at least some processing solvent residue;
   disposing the dry-processed active layer over the wet-processed active layer;
   laminating the dry-processed and wet-processed active layers to form a multilayer electrode film.

16. The process of claim 15, wherein lamination is performed by the process selected from the group consisting of passing the dry-processed and wet-processed active layers between two rollers, passing the dry-processed and wet-processed active layers through one roller while positioned on a moving station, pressing the dry-processed and wet-processed active layers between two plates, and combinations thereof.

17. The process of claim 15, wherein the dry-processed active layer is provided as a rolled free-standing film, and wherein disposing the dry-processed active layer on the wet-processed active layer comprises unrolling the dry-processed active layer.

18. The process of claim 15, further comprising disposing an additional layer over the wet-processed active layer.

19. The process of claim 15, further comprising disposing an additional layer over the dry-processed active layer.

20. The process of claim 15, further comprising disposing an additional layer over the multilayer electrode film.

21. A multilayer electrode film fabrication process comprising:
   providing a dry-processed active layer comprising:
      a first active material; and
      a fibrillized binder;
      wherein the dry-processed active layer is free-standing and is absent of processing solvent residue; and
   providing an active layer slurry mixture comprising:
      a second active material; and
      a processing solvent;
   disposing active layer slurry mixture over the dry-processed active layer;
   drying the disposed active layer slurry mixture to form a wet-processed active layer comprising:
      the second active material; and
      at least some processing solvent residue; and
   laminating the dry-processed and wet-processed active layers to form a multilayer electrode film.

* * * * *